US011209824B1

(12) United States Patent
Kingman

(10) Patent No.: US 11,209,824 B1
(45) Date of Patent: Dec. 28, 2021

(54) NAVIGATION SYSTEM AND METHOD FOR GUIDING AN AUTONOMOUS VEHICLE THROUGH ROWS OF PLANTS OR MARKERS

(71) Applicant: Connor Kingman, Lemoore, CA (US)

(72) Inventor: Connor Kingman, Lemoore, CA (US)

(73) Assignee: Kingman Ag, LLC, Lemoore, CA (US)

( * ) Notice: Subject to any disclaimer, the term of this patent is extended or adjusted under 35 U.S.C. 154(b) by 249 days.

(21) Appl. No.: 16/677,298

(22) Filed: Nov. 7, 2019

Related U.S. Application Data

(60) Provisional application No. 62/860,254, filed on Jun. 12, 2019.

(51) Int. Cl.
| | |
|---|---|
| G05D 1/02 | (2020.01) |
| B60W 30/10 | (2006.01) |
| B60W 30/09 | (2012.01) |
| B60W 30/095 | (2012.01) |
| G06K 9/00 | (2006.01) |
| G05D 1/00 | (2006.01) |

(52) U.S. Cl.
CPC .......... *G05D 1/0212* (2013.01); *B60W 30/09* (2013.01); *B60W 30/095* (2013.01); *B60W 30/10* (2013.01); *G05D 1/0088* (2013.01); *G06K 9/00791* (2013.01); *G05D 2201/0213* (2013.01)

(58) Field of Classification Search
CPC .......... G05D 1/0088–0212; G05D 2201/0213; B60W 30/09–10; G06K 9/00791
See application file for complete search history.

(56) References Cited

U.S. PATENT DOCUMENTS

| | | |
|---|---|---|
| 5,626,376 A | 5/1997 | Parker |
| 6,158,556 A | 12/2000 | Swierczewski |
| 6,974,166 B2 | 12/2005 | Ledford et al. |
| 7,416,210 B2 | 8/2008 | Roelleke |
| 8,731,815 B2 | 5/2014 | Cummings |
| 9,403,499 B2 | 8/2016 | Hicks |
| 9,663,053 B2 | 5/2017 | Saitoh et al. |
| 9,994,219 B2 | 6/2018 | Nilsson et al. |
| 10,007,269 B1 | 6/2018 | Gray |
| 10,035,483 B2 | 7/2018 | Wylezinski et al. |
| 10,037,033 B2 | 7/2018 | Yako et al. |
| 2013/0253753 A1* | 9/2013 | Burnette ............ G06K 9/00798 701/26 |
| 2016/0170414 A1* | 6/2016 | Chen ................... G08G 1/0112 701/27 |

(Continued)

*Primary Examiner* — Calvin Cheung
(74) *Attorney, Agent, or Firm* — Richard A. Ryan

(57) ABSTRACT

A system and method to guide an autonomous vehicle through an area along a path. The area has path markers that define a guidance row. The vehicle has a steering system controlling a steerable wheel to move the vehicle along the path, a control system transmitting steering instructions to the steering system, a guidance system having a data gathering device engaging the path markers and a guidance computer, connected to the control system having a guidance program that calculates the position of the guidance row, the position of the vehicle, the location where the vehicle should be to be on the path and the necessary steering instructions to get on or stay on the path. The path markers can be the trunk of a plant, a post or other upwardly extending member and the data gathering devices can be a LIDAR, radar, camera or other object identification system.

29 Claims, 9 Drawing Sheets

(56) References Cited

U.S. PATENT DOCUMENTS

| | | | |
|---|---|---|---|
| 2017/0270361 A1* | 9/2017 | Puttagunta | B60W 30/00 |
| 2019/0080612 A1* | 3/2019 | Weissman | G08G 1/164 |
| 2019/0243372 A1* | 8/2019 | Huval | B60W 30/0953 |
| 2019/0266418 A1* | 8/2019 | Xu | G06K 9/4604 |
| 2019/0294934 A1* | 9/2019 | Shestak | G06K 9/66 |
| 2019/0367012 A1* | 12/2019 | Matta | G06K 9/18 |

* cited by examiner

NAVIGATION SYSTEM AND METHOD FOR GUIDING AN AUTONOMOUS VEHICLE THROUGH ROWS OF PLANTS OR MARKERS

CROSS-REFERENCE TO RELATED APPLICATIONS

This patent application claims priority to U.S. Provisional Patent Application Ser. No. 62/860,254 filed Jun. 12, 2019.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to apparatuses, systems and methods that are utilized with autonomous vehicles to assist with the movement of the motor vehicle along a designated path. Specifically, the present invention relates to such apparatuses, systems and methods that are utilized to assist with movement of an autonomous vehicle in an area having path-defining obstacles that must be avoided as the vehicle moves through the area. More specifically, the present invention relates to such apparatuses, systems and methods that are configured to allow an autonomous vehicle to utilize one or more rows of obstacles to navigate along a path through an area, such as an agricultural field.

B. Background

Throughout the world, there are a wide variety of different types of motor vehicles that are utilized for accomplishing a wide variety of tasks, most of which involve transporting people, carrying equipment, supplies, materials and a wide variety of other articles and/or moving other vehicles or equipment, typically by towing the vehicle or equipment. Motor vehicles generally have many common components that are used to move or allow the vehicle to move on a freeway, highway, street, road, ground or other surface. Despite the common components, motor vehicles differ substantially in the arrangement and operation of the components depending on whether the vehicle is an automobile, truck, tractor, harvesting machine or the like. Until very recently, nearly all motor vehicles required a driver to be on or inside the vehicle in order to control the movement of the vehicle by manually operating all of the devices and mechanisms that cause the vehicle to start, move, stop and to drive in the desired direction. The general use, configuration and operation of driver-operated vehicles are generally well known to persons who are skilled in the relevant technological fields.

More recently, there has been an increase in the development of motor vehicles that do not require a driver to control the operation and movement of the vehicle. Some of the non-driver vehicles are commonly referred to as remotely controlled vehicles and others are commonly referred to as autonomous vehicles. As generally known to persons skilled in the relevant art, the operation and movement of a remotely controlled motor vehicle is fully controlled by a person who is located remotely, sometimes very remotely, from the vehicle. In contrast, autonomous vehicles are configured to operate and move on their own, without any direct control by a person in the vehicle or outside of the vehicle. In a common configuration, both types of motor vehicles have equipment and systems, such as cameras, computers and the like, that are utilized to analyze the area around the vehicle and control operating components of the vehicle to start, stop and move the vehicle. With regard to remotely controlled motor vehicles, the equipment and systems thereof allow the remotely located person to see and analyze the vehicle surroundings so he or she may make decisions regarding the continued operation and movement of the vehicle. With regard to autonomous motor vehicles, the equipment and systems thereof are configured to allow the motor vehicle to independently determine and analyze the vehicle surroundings and make decisions regarding the operation and movement of the vehicle based on the data the equipment and systems receive and process without any direct human assistance. In general, an autonomous vehicle uses an on-board computer to process data from cameras and/or other navigational devices and systems, from the vehicle itself (i.e., speed, direction and the like) and from other associated equipment to determine whether it is safe or not for the vehicle to move or continue to move in a particular direction. As such, the safe and effective operation of an autonomous vehicle is highly dependent on the selection and configuration of the computers and cameras and/or other navigational devices and systems that control the speed, braking and directional movement of the vehicle.

One area of technology that is beginning to see potential for the use of autonomous and remotely controlled vehicles is in farming and related agricultural operations. As well known to persons who are skilled in the agricultural industry, certain types of motor vehicles are beneficially utilized to prepare the land, plant crops, maintain and treat the field and plants while the plants are growing and/or crops are growing on the plants, harvest the crops from the field or plants and clear the field after harvesting. Such motor vehicles include, but are not limited to, tractors, self-propelled (non-towed) mechanical harvesters and the like. Currently, such motor vehicles typically require an on-board driver to operatively control the vehicle from inside or on the vehicle as the vehicle moves through the field in the paths along or between rows of plants (i.e., row crops, vines, bushes, trees and the like) that will become or produce the crop which is desired by the agricultural process. As well known to persons who are skilled in the art, as the driver moves the vehicle through the agricultural field in order to accomplish the desired work, he or she must direct the vehicle along the path without damaging the plants, plant supports (such as posts, trellises or the like), irrigation equipment and pipes, and a wide variety of other equipment that may be located near the path. Although the path itself is supposed to be clear of obstacles, occasionally some equipment or materials are inadvertently left in the path and, as a result, can interfere with the movement of the vehicle through the field. In addition, there may be pipes, stakes, poles and other obstacles near the path which the vehicle could collide with if the vehicle is not carefully driven.

As stated above, typically a driver is utilized to move an agricultural vehicle through a field and he or she will control the vehicle in a manner to move along the desired path and to avoid any obstacles. For remotely controlled use of such vehicles, the remotely located operator has to be able to view the path and have sufficient control over the vehicle to move the vehicle along the path and to re-direct or stop the vehicle if an obstacle is encountered. In contrast, autonomous agricultural vehicles must rely, usually solely, on the on-board equipment and systems to maintain the vehicle moving along the desired path and to determine which objects are safe to drive over or collide with, such as grass, weeds, small branches and the like, and which objects are not safe to drive over or collide with, such as plants, large branches, support posts, pipes, irrigation manifolds, poles and the like. More specifically, in order to be able to safely and effectively operate an autonomous agricultural vehicle in an agricultural field, the vehicle must have one or more data gathering devices that are connected to a computer control system, having appropriately configured algorithms, that will analyze data from the data gathering device or devices to direct the vehicle along a path that is adjacent to or between rows of plants or other markers and to guide the vehicle from one row to the next. Possible data gathering devices may include GPS systems and devices that can "visualize" the path, such as video cameras, radar and LIDAR (defined) systems that are configured to generate that data which is utilized by the computer control system.

As with conventional (i.e., non-agricultural) autonomous vehicles, a major obstacle to being able to safely and effectively utilize autonomous vehicles in an agricultural field is the need for the vehicle to determine the location of the path along which it should move, the ability to keep the vehicle moving along the path and to re-direct or stop the vehicle when it encounters certain types of objects, namely those that should not be hit, in sufficient time so the vehicle will not make contact with and, likely, destroy the object and/or damage the vehicle. Unlike conventional autonomous motor vehicles that are utilized on roads and highways, however, agricultural areas are known to have a mix of objects that are safe to run over or hit and objects that are not. Some of the objects which are not safe to hit, such as rows of plants in a planted field, orchard or vineyard and posts or trellises which support some types of plants, also define the path along which or through which the autonomous vehicle is to move.

Presently, the on-board equipment and systems of an autonomous vehicle tracks the speed, direction and other movement data of the vehicle, "see" or visualize an object (typically with a camera, radar, LIDAR or the like) in the vehicle's path, transmits the visual data to a computer having an algorithm that processes the movement data and visual data to determine whether the object presents a collision damage problem or not and then transmits commands or other instructions from the computer to the vehicle's braking and/or directional control (i.e., steering) system to take the required action to avoid a collision with the object. To accomplish the above, data gathering devices (such as a camera, radar, LIDAR or the like) must be configured to be able to sufficiently see or visualize objects in the vehicle's path with enough clarity for the computer's algorithm to determine what the object is and whether or not hitting the object presents a danger to the vehicle and/or the object. The algorithm utilized by an autonomous vehicle is configured with a base amount of "knowledge" and the ability to "learn" with regard to what objects can be harmed by coming into contact with the vehicle or cause damage to the vehicle so the system will operate the vehicle in a manner that avoids colliding with such objects.

For an autonomous vehicle to be successful, the equipment and systems of such a vehicle must be configured with a collision avoidance system, including hardware and software, that accomplishes the goals and solves the problems set forth above. Such objectives have been the subject of a number of previous patents. For instance, U.S. Pat. No. 9,994,219 to Nilsson, et al. discloses a device and method for safely stopping an autonomous road vehicle comprising a system and sensors for monitoring the vehicle's surroundings and motion and a signal processing system for processing sensor signals. Among other tasks, a processor is utilized to continuously predict where drivable space exists and calculates a safe trajectory to stop within the drivable space. U.S. Pat. No. 10,007,269 to Gray discloses a collision-avoidance system for autonomous-capable vehicles that continually receives image frames captured from the road or other surface to determine a drivable space in a forward direction of the vehicle. The system is configured to determine, for each frame, whether individual regions of the image frame depict drivable space. U.S. Pat. No. 10,037,033 to Yako, et al. discloses a vehicle exterior surface object detection system for autonomous vehicles having at least one sensor programmed to output environmental signals representing an environment around the vehicle and object detection signals that represent an object or person that may be on or against an exterior surface of the vehicle.

Several prior art systems and methods are presently available to guide an autonomous motor vehicle through an agricultural area. For instance, U.S. Pat. No. 9,877,470 to Crinklaw, et al. describes a robotic agricultural system and method that utilizes GPS to sense an area containing a path and LIDAR as a forward-looking sensor to guide an autonomous agricultural vehicle through an agricultural field to deliver a predetermined amount of agricultural solution over a predetermined path. A mobile control center wirelessly informs the autonomous delivery vehicle of the predefined path, which is identified by a mapper vehicle, as it moves through the area. The mapper vehicle drives a path through the area that is substantially similar to the path that is to be taken by the autonomous agricultural vehicle during operation thereof to create a map of the area that includes GPS and LiDAR data that is transmitted to the mobile control center where it is stored for use by the autonomous vehicle. Although the agricultural vehicle moves autonomously through the area, it does require the mapped information from the mapping vehicle to define the predetermined path along which the autonomous vehicle moves. As well known in the agricultural industry, however, there have been and generally continue to be significant problems with regard to being able to develop the necessary equipment and systems to safely move an autonomous vehicle through an agricultural field having rows of plants that define the paths along which the vehicle should move. Many of these same issues are also applicable to the utilization of an autonomous vehicle at a construction site to provide site preparation and other tasks.

One issue that further limits the applicability of autonomous vehicles in the agricultural and construction industries is the frequent need and use of such motorized vehicles, of any type, to move through a field or job site while it is towing another vehicle or an implement. The towed vehicle or implement can be sprayers that are utilized to spray water, fumigants, liquid, solid or semi-solid chemical mixtures (such as fertilizers or the like), and other materials onto the ground and/or plants. The towed vehicle or implement can be machines that are configured to engage with and perform work on the land, such as disc harrows having a plurality of discs, rippers having a plurality of ripper shanks, cultivators having a plurality of teeth and other types of tilling machines. In other configurations, the towed vehicle or implement can comprise one or more rollers, chains and other devices or tools that are mounted on or connected to a moveable platform that functions as a towed vehicle or implement to engage the land. The towed vehicle or implement can be or have machines and/or devices which engage the plants, such as machines which prune the plants and devices which cut the tops of the plants. As well known in the relevant arts, a vehicle or implement being towed can have one or more wheels that rotatably engage the surface on which it moves, utilize one or more discs, shanks, teeth or the like to engage and work the surface in a desired manner and/or comprise a sled or other platform that slides across the surface or have a wide variety of other configurations.

For purposes of describing the present invention, motorized vehicles (of any type and mode of operation, such having a driver, remotely operated or autonomous) that is or can be utilized to tow another vehicle or implement is referred to as a "towing vehicle" and a vehicle, implement or the like which is towed by the towing vehicle (regardless of how it is towed or how it moves across the surface over which it is being towed) is referred to as a "towed vehicle". For agricultural use, the towing vehicle can be a tractor, truck, self-propelled harvesting machine, ATVs, UTVs and the like and the towed vehicle can be a wide variety of working vehicles and implements, such as those described above. One common problem with the operation of a towing vehicle while the vehicle is being utilized to tow or otherwise pull a towed vehicle is the inability to properly operate and control the towing vehicle when the towed vehicle fails to operate or function as it should for proper towing operation. For instance, when a towing vehicle is towing a towed vehicle through a field (such as a tractor towing a ripper having a plurality of ripper shanks), it is not uncommon for a component of the towed vehicle (such as one of the shanks) to break or otherwise malfunction in a manner which can make it difficult for the towing vehicle to maintain movement in the desired direction, such as on a particular path through a field or between rows of plants and/or for the towed vehicle to accomplish the objectives for which it is being towed. In other towing circumstances, a tire, tread or ski of the towed vehicle may break or otherwise fail. The failure of a component of the towed vehicle or towing system can make it difficult to continue operating the towing vehicle along the desired path, which can result in damage to the towing vehicle, towed vehicle and/or the area where the towing operations are being utilized (i.e. the agricultural field and/or the plants in the field).

For a towing vehicle that has a driver or which is being operated by a remote operator, the driver or operator can take the action, such as compensating in his or her steering for the malfunction or stopping the towing vehicle, to avoid or prevent a collision or other damage as soon as he or she is aware of the problem with the towed vehicle. The difficulties of operating a towing vehicle with a malfunctioning towed vehicle are exasperated when the towing vehicle is an autonomous vehicle. For these vehicles, the control system of an autonomous vehicle may not realize its operations are being affected by a malfunctioning towed vehicle as it attempts to compensate in its movement for the malfunction. In any of these circumstances, the malfunction of a towed vehicle can cause damage and injuries (or even death) which can result in significant financial losses or costs. Despite the advances in autonomous vehicles and the ability of such vehicles to be safely operated when they are utilized on roads and highways, presently available systems and methods of operation do not provide a solution to safely, effectively and efficiently operating autonomous vehicles in agricultural areas.

What is needed, therefore, is an improved system and method for safely, effectively and efficiently operating an autonomous vehicle in an agricultural area. More specifically, what is needed is an improved system and method of operation that can be utilized with an autonomous vehicle that allows the vehicle to move in an externally unassisted manner through an agricultural area having a plurality of rows of plants or similarly upwardly extending members to accomplish the desired work objectives. The new system and method should be configured to allow an autonomous agricultural vehicle to operate in a manner which prevents damage to equipment and plants in an agricultural area in order facilitate the commercial cultivation of crops. The new system and method should be structured and arranged to guide an autonomous agricultural vehicle through an agricultural area having a plurality of rows of plants by utilizing the rows of plants, plant support structures or similarly configured items in the agricultural field to define the path the vehicle should move through the area. In one configuration, the new system and method utilizes opposing rows of plants, plant support structures or other markers to define a path between the opposing rows. The new system and method should be configured for use of the autonomous vehicle as a towing vehicle that is towing another vehicle or implement as the towed vehicle and be able to notify the control system of the vehicle that the towed vehicle is malfunctioning or has malfunctioned and, as a result, is likely to affect the intended or desired operation of the towing vehicle and/or the towed vehicle.

SUMMARY OF THE INVENTION

The following presents a simplified summary of the disclosure in order to provide a basic understanding to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later. A more complete appreciation of the present invention and the scope thereof can be obtained from the accompanying drawings which are briefly summarized below and the following detailed description of the presently preferred embodiments of the present invention.

As will be readily appreciated by persons who are skilled in the art, the system and method of the present invention provides the benefits and solves the problems identified above. That is to say, the present invention discloses a new navigation system and method for safely, effectively and efficiently guiding an autonomous vehicle through an agricultural area, such as a planted field having row crops, vines, trees or the like. More specifically, the improved system and method of the present invention are utilized with an autonomous vehicle to allow the vehicle to move in an externally unassisted or independent manner through an agricultural area that has a plurality of rows of plants or other specifically positioned upwardly extending field markers to accomplish one or more desired work objectives. The new system and method is structured and arranged to guide an autonomous vehicle through an agricultural area having a plurality of rows of plants by utilizing the trunks of the plants, plant support structures that support or are otherwise associated with the plant or other similarly configured path markers in the agricultural field to define the path the autonomous vehicle is to move through the agricultural area. In one configuration, the path markers can be specially positioned, stand-alone markers that have been placed in the field for the purposes of utilizing the new navigation system and method of the present invention.

The new system and method of the present invention is also configured for use of an autonomous vehicle as a towing vehicle that is towing another vehicle or implement as the towed vehicle. In this use, the new system and method can also be utilized to notify the control system of the vehicle that the towed vehicle is malfunctioning or has malfunctioned and, as a result, is affecting or is likely to affect the intended operation of the towing vehicle and/or the towed vehicle. The new navigation system and method allows the autonomous vehicle, whether operating alone or as a towing vehicle, to operate in a manner which prevents damage to equipment and plants in the field in order facilitate the commercial cultivation of crops. The new system and method for allowing an autonomous vehicle to navigate its way through an agricultural field are configured to be utilized with a wide range of different types of agricultural vehicles and, when used as a towing vehicle, with a wide variety of different types of towed vehicles and towing arrangements. For instance, the new navigation system and method of the present invention can be beneficially utilized in the agricultural industry when an autonomous vehicle is utilized as a towing vehicle to tow vehicles or implements to accomplish a variety of agricultural tasks, including spraying and discing, ripping, cultivating and like tilling operations.

As set forth in more detail below, the new navigation system and method of the present invention are configured to be particularly useful for use with autonomous vehicles that are being utilized as a towing vehicle in the agricultural industry, such as an autonomous agricultural vehicle that is being used to tow an implement through a field or along a path along or between rows of plants to assist growers and others with plant preparation, maintenance, harvesting and removal operations. When utilized in an agricultural field, the new navigation system and method allows the towing vehicle to operate as quickly and efficiently as possible and in a manner that prevents damage to equipment and plants in the field in order facilitate the commercial cultivation of crops. For purposes of describing the configuration and use of the present invention and the related prior art with regard to use of the system and method with a towing vehicle in the agricultural industry, the term "plant" is utilized herein to collectively refer to any type of row crop, vine, tree, bush or the like, the term "crop" is utilized herein to collectively refer to any beneficial product that is produced by a plant and the term "agricultural area" is utilized herein to collectively refer to a field, vineyard, orchard or any other area that is utilized to grow plants to produce crops. While describing the present invention or the related prior art, reference may be made to certain specific types of plants, crops, growing areas and/or vehicles, as well as uses for the vehicles, in order to describe the various attributes of the new system and method for use in agricultural areas and/or to better explain the prior art. However, persons who are skilled in the art will readily appreciate that these same attributes are also relevant to other types of plants, crops and/or growing areas.

In one embodiment of the present invention, the new vehicle navigation system for navigating through an area along a path on a surface in an intended/desired direction of travel that generally comprises a plurality path markers that are disposed in or above the surface of the area, an autonomous vehicle having a vehicle steering system which is operatively connected to one or more steerable wheels, a control system associated with the autonomous vehicle, a guidance system associated with the autonomous vehicle and a guidance program associated with the guidance computer. The path markers, which define a guidance row, each have a body that extends upwardly above the surface of the area. The vehicle steering system is configured to transmit steering instructions to the one or more steerable wheels to control the directional movement of the autonomous vehicle. The control system is configured to transmit the steering instructions to the vehicle steering system to control the steerable wheel in a manner which directs the autonomous vehicle on the surface along the path. The guidance system determines positioning information that locates the path markers of the guidance row in order to calculate a vehicle position of the autonomous vehicle relative to the guidance row and a path position in spaced apart relation to the guidance row that is utilized to identify where the autonomous vehicle should be located to be on the path. The guidance system has a data gathering device carried by the autonomous vehicle and a guidance computer that is connected to or integral with the control system. The data gathering device is configured to engage, as appropriate for the data gathering device, at least one of the path markers in the guidance row. The guidance program, which is electronically connected to each of the control system and the data gathering device, is configured to calculate the positioning information and the path position and to utilize each of the positioning information and the path position to calculate the steering instructions that are necessary to guide the autonomous vehicle along the path and transmit the steering instructions to the control system. The system can be utilized with an autonomous vehicle that is towing a towed vehicle, which towed vehicle is connected to the autonomous vehicle by a towing mechanism.

In an embodiment where the area is an agricultural area, the path markers can be the trunk of a plant, the post of a plant support structure or a specially dedicated upwardly extending member. The path position is calculated based on the spacing distance between the vehicle position and the guidance row to position the autonomous vehicle in spaced apart relation to the guidance row and/or the row spacing between adjacent guidance rows to, typically, position the autonomous vehicle at or near an equal distance to the guidance rows. The data gathering device can be a LIDAR system, a radar system, a camera system and/or a variety of other devices which can "read" the path markers. In one embodiment, the system comprises marker segments that are defined by or located on the body of each of the path markers, with the data gathering device being configured to engage the marker segment of at least one of the path markers in the guidance row. The marker segment has a first end and a second end. In one configuration, the first end of the marker segment is in corresponding relation to a lower end of the path marker and/or the second end of the marker segment is in corresponding relation to an upper end of the path marker. In another configuration, the first end of the marker segment is in spaced apart relation above the lower end of the path markers and/or the second end of the marker segment is in spaced apart relation below the upper end of the path markers. In yet another embodiment, the marker segments can comprise a marking device that is positioned on the path markers, with the marking device being selected to be beneficially engaged by the data gathering device.

In certain embodiments, the new system comprises a directional sensor that is associated with the steerable wheel of the autonomous vehicle and an operating program which is electronically connected to the control system. The directional sensor is structured and arranged to determine a directional position of the steerable wheel. The operating program is configured to compare the directional position of the steerable wheel to the steering instructions to determine whether the steering instructions and the directional position of the steerable wheel are either in a corresponding relation, which indicates a normal operating condition, or in a non-corresponding relation, indicating a malfunctioning condition. The operating program electronically connects the directional sensor to a notification device, with the notification device being configured to notify the control system of the normal operating condition and/or the malfunctioning condition. In one configuration of the system, the malfunctioning condition is only indicated if the non-corresponding relation exceeds an acceptable parameter relative to the normal operating condition. If there is a malfunctioning condition, the control system can be configured to take appropriate action, which in some circumstances is to turn the autonomous vehicle off and notify a person who is job it is to monitor the operation of the autonomous vehicle.

In one embodiment of the present invention, the new method of autonomously navigating through an area along a path on a surface in an intended/desired direction of travel comprises the steps of: (a) providing an autonomous vehicle that has a vehicle steering system operatively controlling at least one steerable wheel, a guidance system having one or more data gathering devices connected to a guidance computer and a plurality of path markers in the area that define at least one guidance row along which the autonomous vehicle will move when moving on the path, the guidance row having a first end and a second end; (b) positioning the autonomous vehicle at or near the first end of the guidance row to allow the autonomous vehicle to move in the intended/desired direction of travel toward the second end of the guidance row; (c) operating the autonomous vehicle to move the autonomous vehicle toward the second end of the guidance row; (d) operating the data gathering devices to operatively engage one or more of the plurality of path markers in at least one guidance row; (e) operating a guidance program with the guidance computer to determine positioning information which locates the path markers of the guidance row in order to calculate a vehicle position for the autonomous vehicle relative to the guidance row and to calculate a path position in spaced apart relation to the guidance row that is utilized to identify where the autonomous vehicle should be located to be on the path; (f) comparing the vehicle position of the autonomous vehicle to the path position to determine the appropriate steering instructions that are necessary to keep or place the vehicle position of the autonomous vehicle at least substantially in alignment with the intended/desired direction of travel so as to position the autonomous vehicle on the path; (g) transmitting the steering instructions to the vehicle steering system by the control system so as to place the steerable wheel or wheels in position to move the autonomous vehicle along the path in the intended/desired direction of travel; and (h) moving the autonomous vehicle along the path toward the second end of the guidance row in the intended/desired direction of travel pursuant to the steering instructions. The method can be utilized with an autonomous vehicle that is towing a towed vehicle, which towed vehicle is connected to the autonomous vehicle by a towing mechanism.

In another embodiment of the new method, the method further comprises, as step (i), operating a directional sensor to determine a directional position for the steerable wheel or wheels and then comparing the directional position to the intended/desired direction of travel to determine if the directional position is either in corresponding relation to the intended/desired direction of travel of the steering instructions or it is in non-corresponding relation to the intended direction of travel. The method further comprises, as step (j), operating a notification device to activate a directional indicator signal that notifies the control system of a malfunctioning condition based on the directional position being in the non-corresponding relation if the non-corresponding relation is such that it exceeds a preselected acceptable parameter relative to a normal operating condition for the autonomous vehicle to allow the control system to take an appropriate action with regard to the malfunctioning condition.

The path markers of the method can comprise at least one of a trunk of a plant, a post of a plant support structure and a specially selected upwardly extending member. The data gathering device is typically one of a LIDAR system, a radar system and a camera system. The path markers can have or comprise a marker segment that is defined by or located on the body of each of the path markers, with the data gathering device being configured to engage the marker segment of at least one of the path markers in the guidance row. The marker segment will have a first end and a second end in spaced apart relation to the first end. In one configuration, at least one of the first end of the marker segment is in corresponding relation to a lower end of the body of the path markers and the second end of the marker segment is in corresponding relation to an upper end of the body of the path markers. In another configuration, the first end of the marker segment is in spaced apart relation to the lower end path markers and/or the second end of the marker segment is in spaced apart relation to the upper end of the path markers. In yet another embodiment, at least one of the marker segments comprises a marking device on one or more of the path markers.

1. Accordingly, the primary objective of the present invention is to provide a navigation system and method for use with an autonomous vehicle that has the benefits described above and elsewhere herein and which overcomes the limitations and problems that are associated with currently available systems and methods for navigating autonomous vehicles.

It is a primary objective of the present invention to provide a navigation system and method for use with an autonomous vehicle that allows the vehicle to move through an agricultural area having a plurality of rows of plants, plant supports or other upwardly extending path markers, including plant supports, earthen rows and specially placed marking members, that are utilized to guide the vehicle along a path through the area in order to accomplish one or more desired work objectives.

It is also an object of the present invention to provide a system and method for use with autonomous vehicles that are specially configured for use in the agricultural industry so as to allow improved operations of such vehicles to prepare an agricultural area, plant plants in the agricultural area, maintain the agricultural area and/or plants, harvest crops, and/or remove waste materials.

An important aspect of the present invention is that it provides a new navigation system and method for autonomous vehicles which achieves the goals of the above-described objectives.

Another important aspect of the present invention is that it provides a new navigation system and method for use with an autonomous vehicle which are utilized in an agricultural field to efficiently and effectively guide the vehicle through the field in a manner which accomplishes the work objectives of the vehicle without damaging the field or any plants, plant structures, equipment or other items in the field.

Another important aspect of the present invention is that it provides a new navigation system and method for use with an autonomous vehicle that allows the vehicle to move through a prepared or planted field in an externally unassisted manner to accomplish the desired work objectives by utilizing upward extending items, including rows of plants and plant supports, in the field as path markers to guide the vehicle through the field.

Another important aspect of the present invention is that it provides a new navigation system and method for use with an autonomous vehicle which are configured for use in an agricultural field having a plurality of earthen rows, rows of plants, plant supports or specially positioned, upwardly extending path markers that are utilized by the system and method to guide the autonomous vehicle through the field along a desired path.

An important aspect of the present invention is that it provides a new navigation system and method for use with all types of autonomous agricultural vehicles that can be beneficially utilized in an agricultural field and with a wide variety of different types of plants that are grown in such fields.

An important aspect of the present invention is that it provides a new navigation system and method for use with an autonomous vehicle that is being utilized as a towing vehicle in an agricultural field to guide the towing vehicle and towed vehicle through the field and to quickly detect that the towed vehicle has malfunctioned or is otherwise not operating properly so that the control system of the towing vehicle can take action to avoid damage to the vehicles, damage to other property and/or injuries to persons.

Another important aspect of the present invention is that it provides a new navigation system and method for use with autonomous agricultural towing vehicles, including tractors, trucks, ATVs, harvesters and the like, that are utilized to tow a towed vehicle, such as a sprayer, disc harrow, ripper, cultivator and other types of implements, through an agricultural field or along a path between rows of plants.

Yet another important aspect of one configuration of the present invention is that it provides a new navigation system and method for use with autonomous agricultural vehicles that are being utilized as a towing vehicle, such as to tow an implement through a field or along a path between rows of plants in order to prepare the agricultural area for the plants, plant the plants in the agricultural area, maintain the agricultural area and/or plants, harvest crops and/or remove any waste materials from the agricultural area.

As will be explained in greater detail by reference to the attached figures and the description of the preferred embodiments which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. As will be readily understood and appreciated, the scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth in the text below. The enclosed figures are illustrative of one or more potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the navigation system and method of the present invention and examples of various towing and towed vehicles with which the new system and method may be utilized, persons who are skilled in the art will readily appreciate that the present invention is not so limited. In addition, the exemplary embodiments of the present system and method are shown and described with only those components which are required to disclose the present invention. It may be that some of the necessary elements for using the present invention are not shown or are not necessarily described below, but which are well known to persons who are skilled in the relevant art. As will be readily appreciated by such persons, the various elements of the present invention that are described below may take on any form consistent with those forms which are readily realized by persons of ordinary skill in the art having knowledge of autonomous vehicles that can be utilized in an agricultural field and towed vehicles which can be beneficially towed by such vehicles. For instance, the autonomous vehicles and towed vehicles for the present invention may be virtually any configuration of an agricultural vehicle that is utilized as a towing or towed vehicle.

Figure 13:
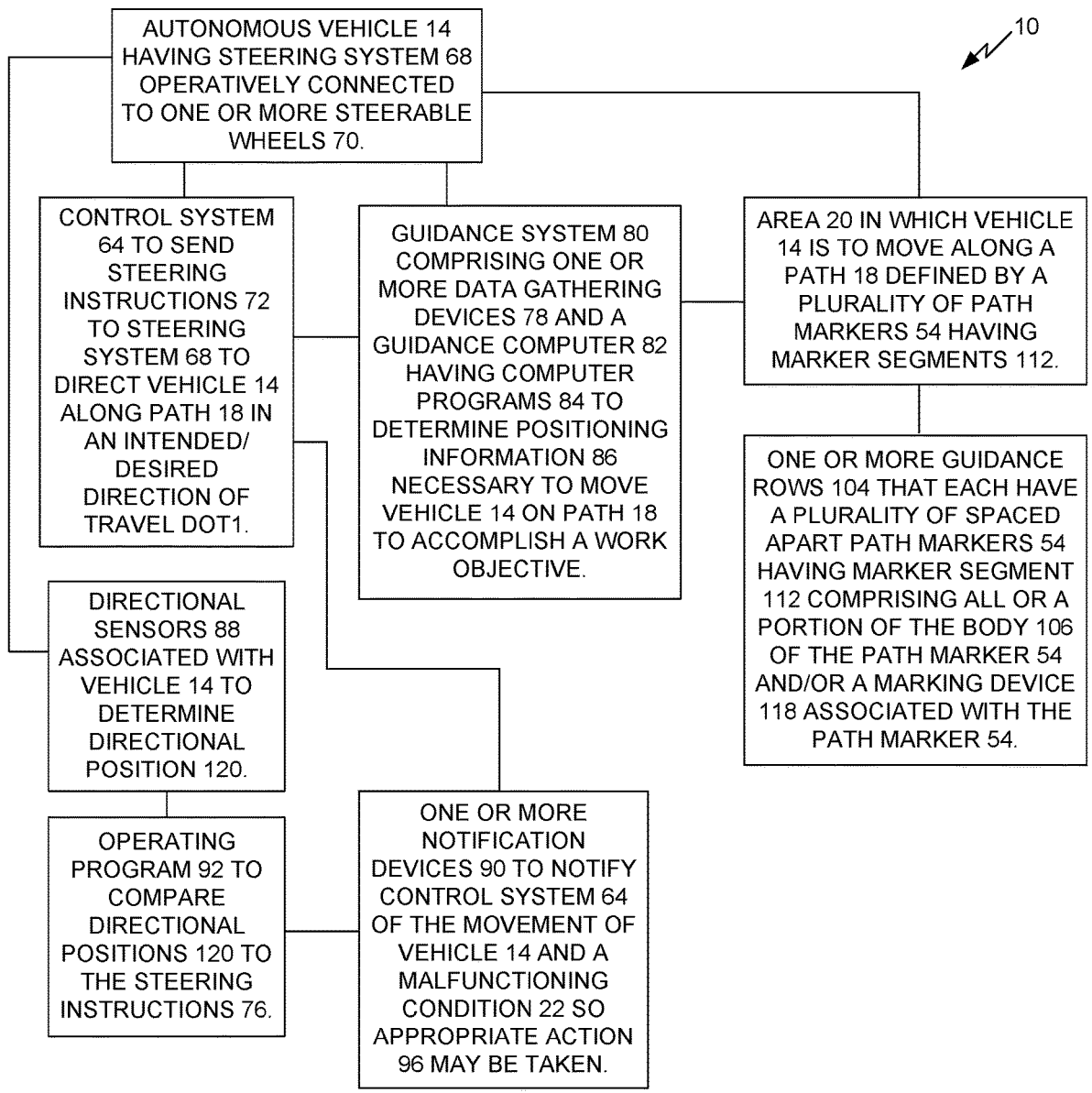
FIG. 13 is a chart of one of the preferred configurations of the navigation system of the present invention.
Figure 14:
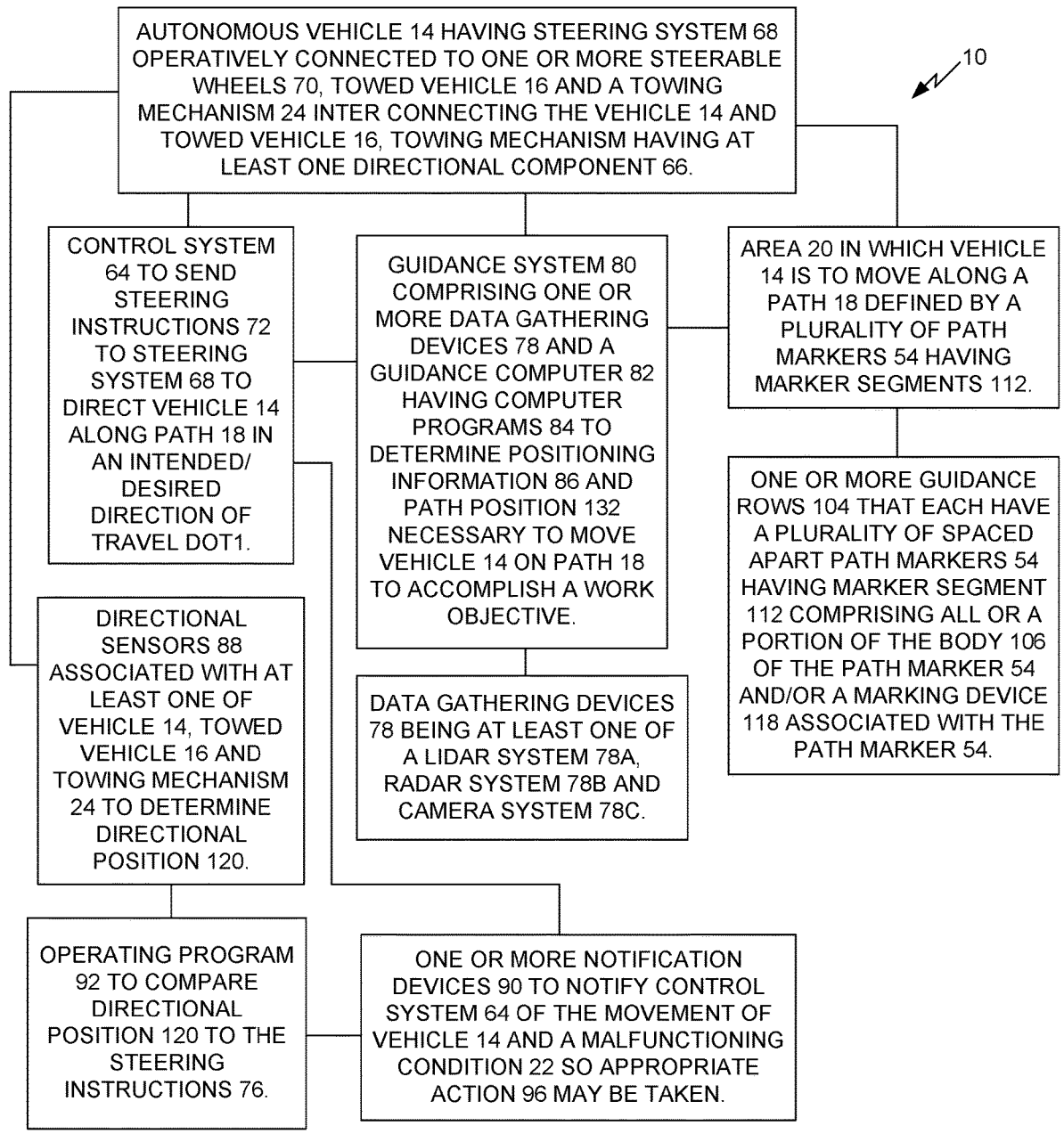
FIG. 14 is a chart of an alternative configuration for the navigation system of the present invention showing use of the system when the autonomous vehicle is being utilized as a towing vehicle towing a towed vehicle.

A navigation system that is configured pursuant to one of the preferred embodiments of the present invention is shown generally as 10 in FIGS. 13-14. A navigation method utilizing the new system 10 is shown as 12 in FIGS. 15-16. As described in more detail below and shown in FIGS. 1, 5-6 and 13-16, the system 10 and method 12 of the present invention are beneficially configured for use with an autonomous vehicle 14, including those that are being utilized to tow a towed vehicle 16, which moves along a path 18 in an agricultural area 20 as the autonomous vehicle 14 moves in an intended or desired direction of travel (shown as DOT1 in FIGS. 1, 3 and 6) in the agricultural area 20, as shown in FIGS. 1, 3 and 5-6. As also set forth in more detail below, the navigation system 10 and method 12 of the present invention are utilized to safely and efficiently guide the autonomous vehicle 14, whether being utilized with the towed vehicle 16 or not, through the agricultural area 20. The new system 10 and method 12 of the present invention can also be utilized to determine when the towed vehicle 16 is in a malfunctioning condition 22 that is or will like cause the autonomous vehicle 14 to deviate or at least attempt to deviate from its intended or desired direction of travel DOT1 and move, or at least attempt to move, in an unintended or undesired direction of direction of travel, which is shown as DOT2 in FIG. 4, and/or otherwise fail to accomplish the desired work activity. As will be readily appreciated by persons who are skilled in the art, when the towed vehicle 16 is in a malfunctioning condition 22, the towing vehicle 14 and towed vehicle 16 are usually unable to accomplish the desired tasks or purposes for which the towed vehicle 16 is being towed and are likely to cause damage to property and/or injure people. The system 10 and method 12 of the present invention can be configured to detect the malfunctioning condition 22.

The system 10 and method 12 of the present invention are adaptable for use with a wide range of different types of autonomous vehicles 14 and towed vehicles 16. For instance, the autonomous vehicle 14 can be any type of motorized vehicle that is or which can be utilized in an agricultural area 20 and, if desired, to tow a towed vehicle 16. A towed vehicle 16 can be any type of motor vehicle or implement, regardless of how the towed vehicle 16 is towed or how the towed vehicle 16 moves across the surface over which it is being towed. For agricultural use, the autonomous vehicle 14 can be a tractor, truck, self-propelled harvesting machine, ATVs, UTVs and the like and the towed vehicle 16 can be a wide variety of working vehicles and implements, such as a sprayer (shown as 16 in FIGS. 1 and 3-5), ripper disc harrow, cultivator and other types of agricultural implements.

Figure 1:
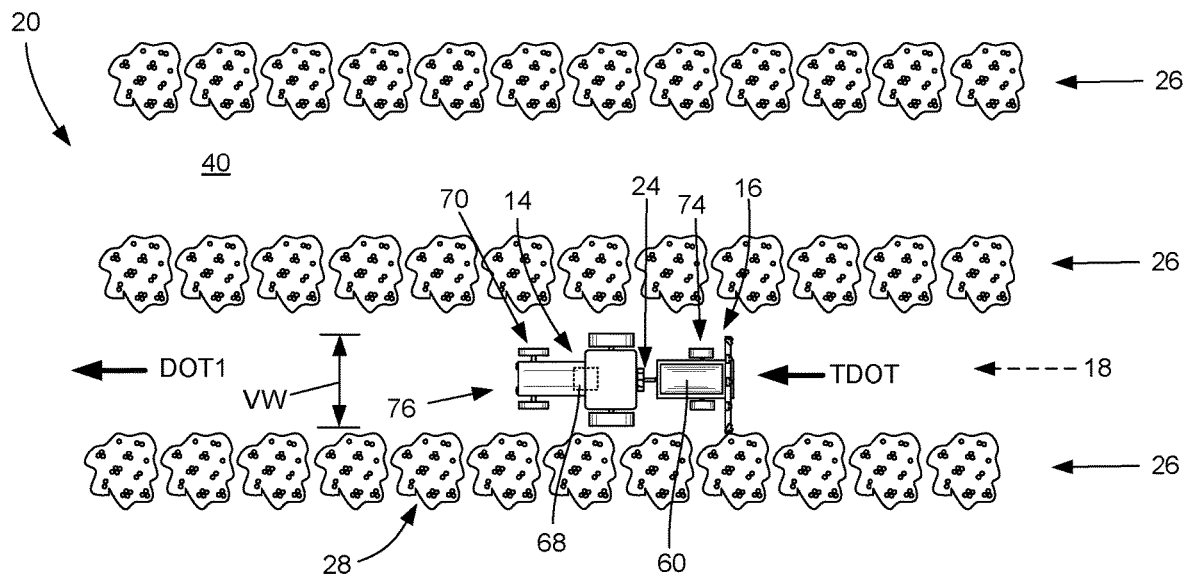
FIG. 1 is a top plan view of an autonomous vehicle towing a towed vehicle in an agricultural area having plants that are disposed in rows with the towing vehicle and towed vehicle moving along a path between rows of plants and using the trunks of thereof for navigation according to the new navigation system and method of the present invention, with the plants being trees in an orchard, the towing vehicle being a tractor, the towed vehicle being a sprayer and the towing vehicle moving in an intended/desired direction of travel in a normal operating condition.
Figure 3:
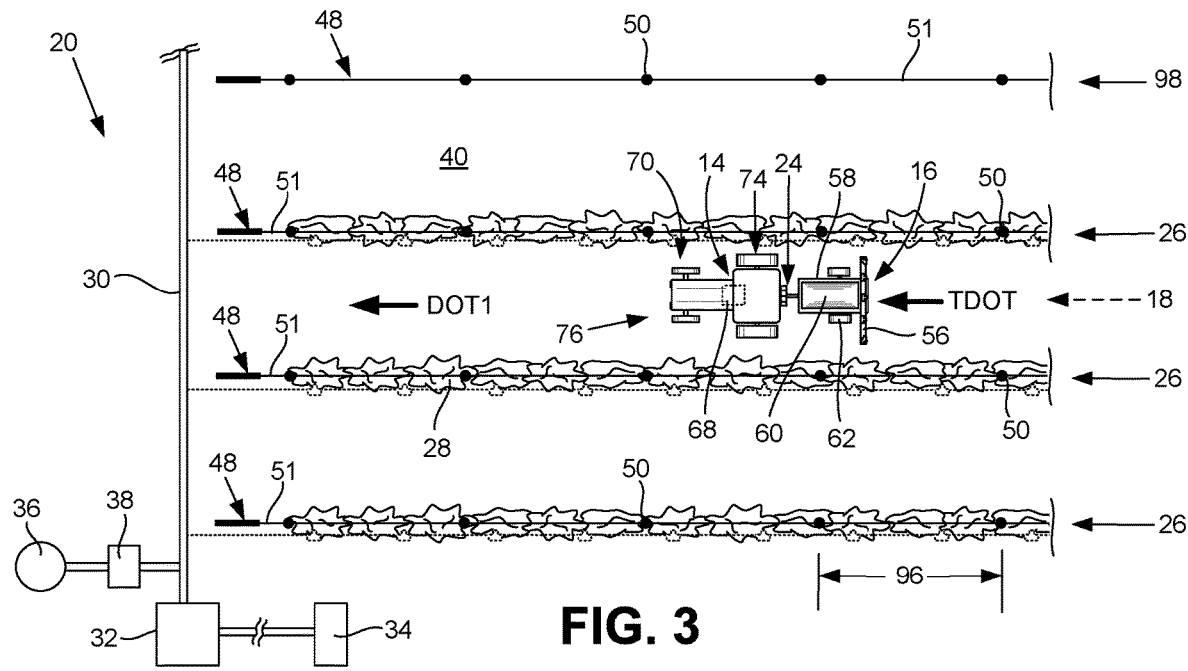
FIG. 3 is a top plan view of an autonomous vehicle towing a towed vehicle in an agricultural area having plants that are disposed in rows with the towing vehicle and towed vehicle moving along a path between rows of plants and using the trunks of thereof for navigation according to the new navigation system and method of the present invention, with the plants being vines in a vineyard, the towing vehicle being a tractor, the towed vehicle being a sprayer, the towing vehicle moving in an intended/desired direction of travel in its normal operating condition and the uppermost row illustrating a plant support structure having a plurality of posts defining a post row.
Figure 5:
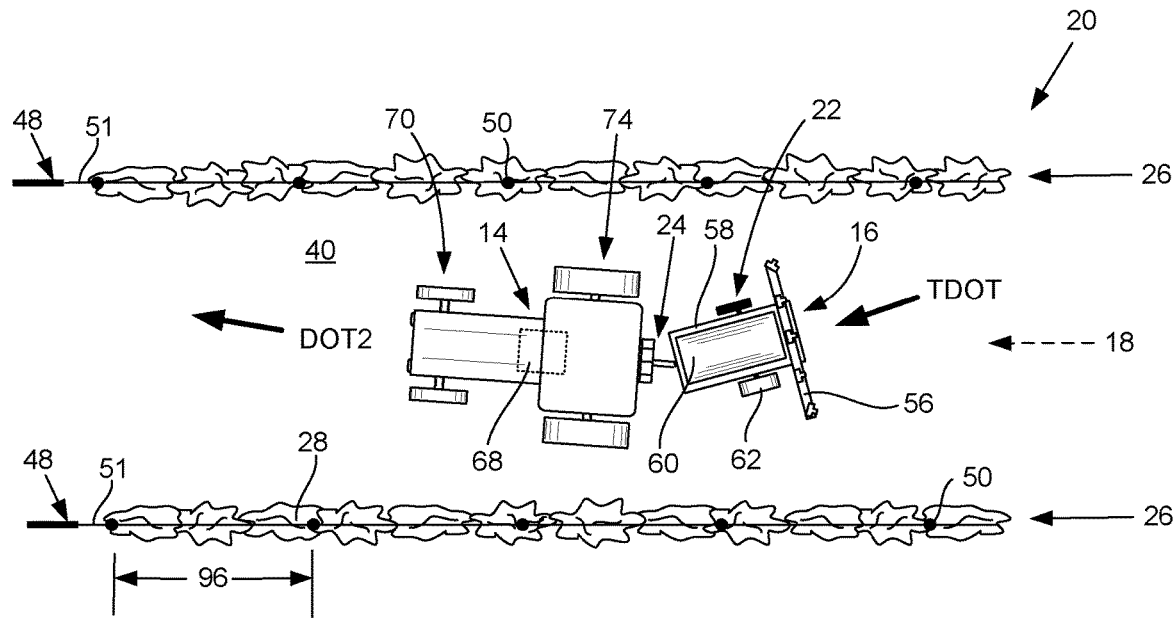
FIG. 5 is a top plan view of the autonomous vehicle, towed vehicle and agricultural area of FIG. 3, with the towed vehicle shown in a malfunctioning condition that is causing the autonomous vehicle to move in an unintended/undesired direction of travel.
Figure 6:
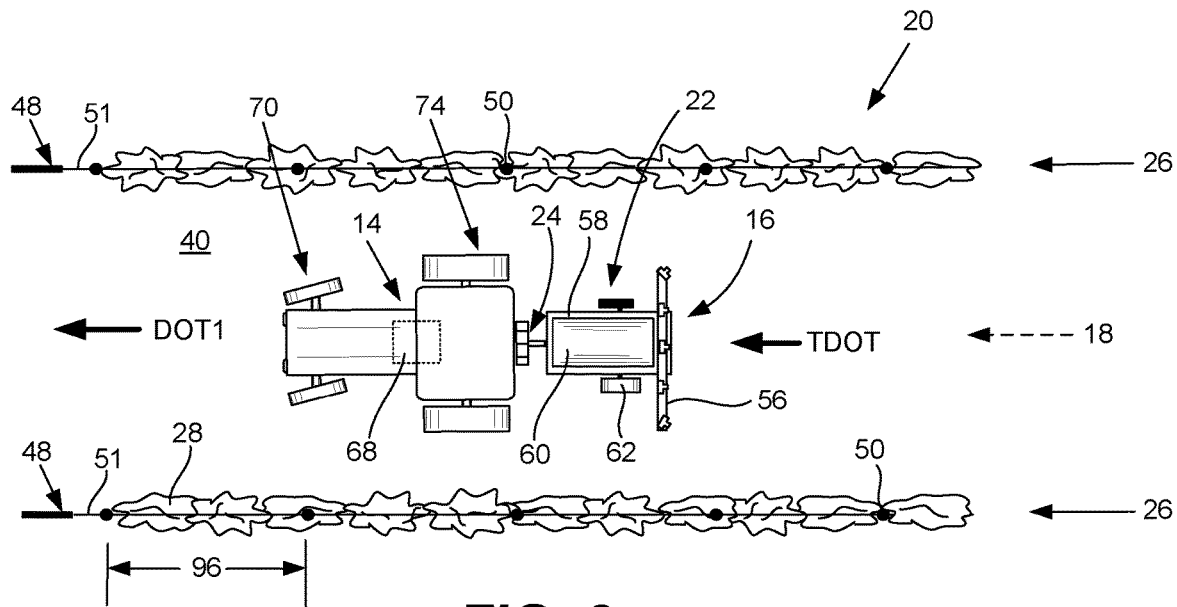
FIG. 6 is a top plan view of the autonomous vehicle, towed vehicle and agricultural area of FIG. 5 with the towing vehicle compensating for the malfunctioning condition of the towed vehicle in order to move in the intended/desired direction of travel.

When the autonomous vehicle 14 is utilized as a towing vehicle, a towing mechanism 24 interconnects the autonomous vehicle 14 and the towed vehicle 16 in a manner which allows the autonomous vehicle 14 to effectively, safely and, preferably, efficiently tow the towed vehicle 16 along the path 18 in the area 20, as shown in FIGS. 1, 3 and 5-6. Normally, as shown in FIGS. 1 and 3, the towing mechanism 24 helps the autonomous vehicle 14 to tow the towed vehicle 16 along the path 18 in the intended/desired direction of travel DOT1. When the towed vehicle 16 is in a malfunctioning condition 22, as shown in FIGS. 5 and 6, this typically places undesirable forces on the towing mechanism 24, which can damage the towing mechanism 24, in addition to damaging the autonomous vehicle 14, towed vehicle 16 and/or other objects and/or cause injuries to people. If the towing mechanism 24 is damaged while in use in the agricultural area 20, towing and other operations generally have to cease until the towing mechanism 24 is repaired or replaced.

The new system 10 and method 12 of the present invention is configured to be particularly useful for use with autonomous vehicles 14 that are being utilized as an agricultural vehicle, whether or not the autonomous vehicle 14 is towing an implement, that is moving through an agricultural field 20, such as along a path 18 between rows 26 of plants 28 (as shown in FIGS. 1, 3 and 5-6) and/or other upright members (as described below) to assist the growers and other persons with preparation, maintenance, harvesting and removal operations. When utilized in an agricultural field 20, the new system 10 and method 12 allows the autonomous vehicle 14 to operate as quickly and efficiently as possible and in a manner that prevents damage to equipment, such as the pipe 30, manifold 32, pump 34, storage tank 36 and injector 38 shown in FIG. 1, and plants 28 in the field 20 in order facilitate the commercial cultivation of crops. Although the autonomous vehicle 14 shown in FIGS. 1 and 3-5 is a tractor, persons who are skilled in the art will readily appreciate that autonomous vehicle 14 can be any type of configuration of agricultural vehicle, including cars, trucks, mechanical harvesters, ATVs, RVs and the like that can move on a surface 40 which is defined by the path 18 in which the autonomous vehicle 14 moves in an intended/desired direction of travel DOT1 through an agricultural field 18.

Figure 2:
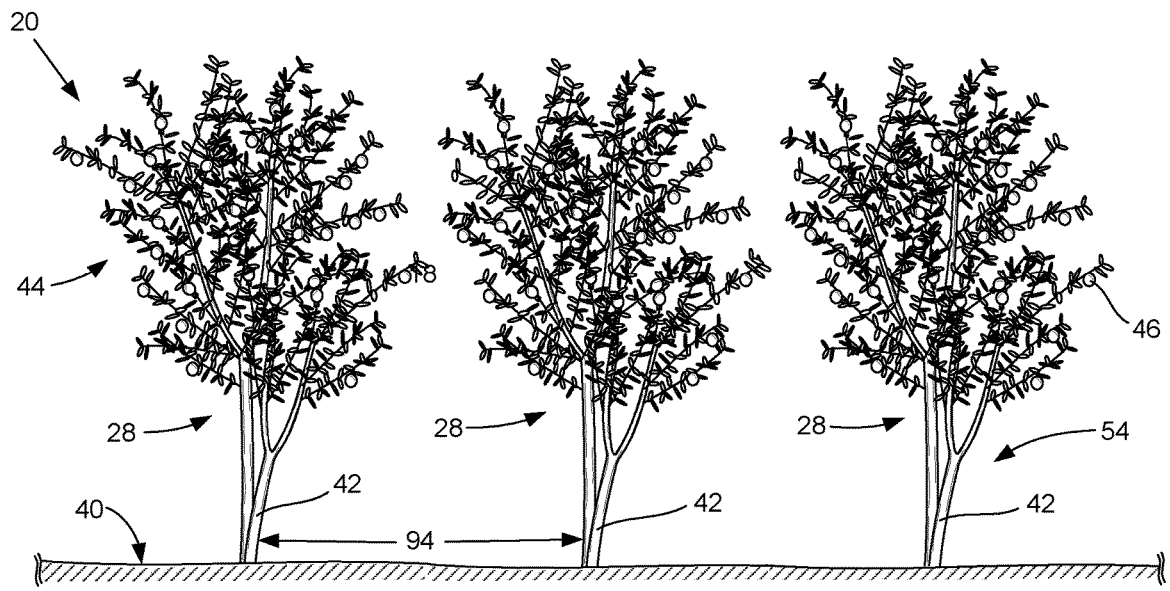
FIG. 2 is a side view of three of the trees of FIG. 1 particularly showing the trunks thereof, which are being utilized for the new navigation system and method of the present invention.
Figure 4:
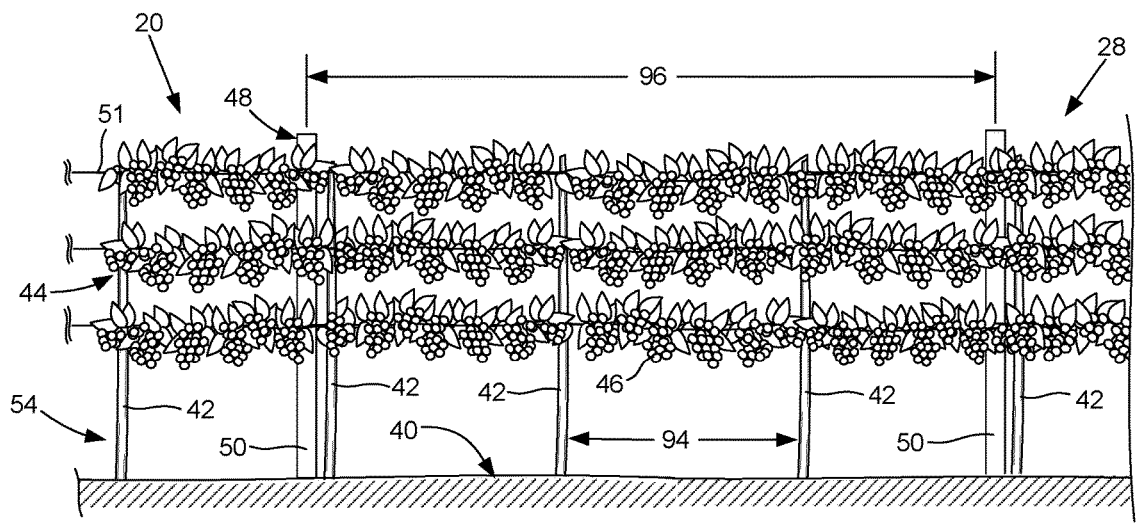
FIG. 4 is a side view of five of the vines of the vineyard of FIG. 3 particularly showing the trunks thereof and a pair of posts that are supporting the vines, which trunks and/or posts are being utilized for the new navigation system and method of the present invention.
Figure 11:
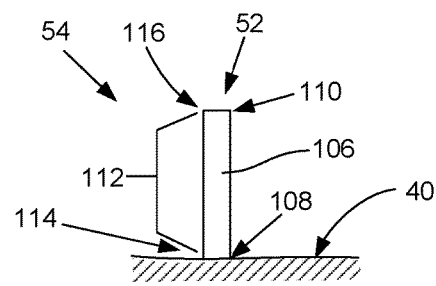
FIG. 11 is a side view of the specially positioned marking member of FIG. 10 showing the entire member being utilized as a marker segment.
Figure 12:
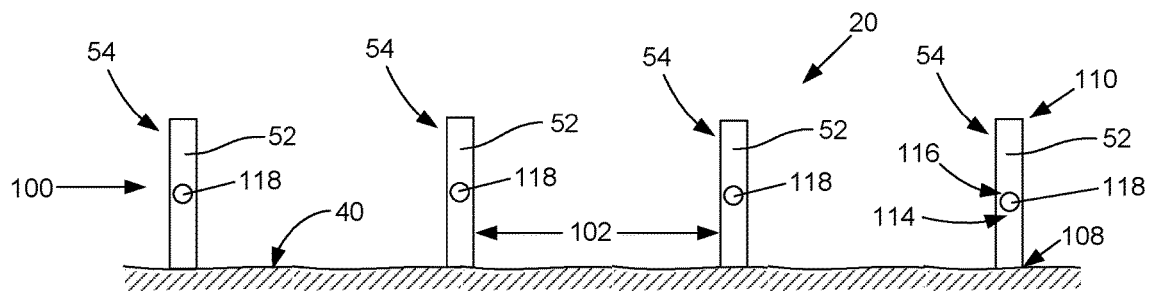
FIG. 12 is a side view of a plurality of upwardly extending members in an area, with the upwardly extending members defining a member row and each of the upwardly extending members having a marking device thereon to further assist with guiding an autonomous vehicle through an agricultural field.

The agricultural area 18 may be any type of area that is being utilized or will be utilized to grow plants 28 in rows 26. In FIGS. 1 and 2, the plants 26 are trees that are grown in an orchard (as the agricultural area 20), with the plants 28 having a trunk 42 that extends upward from the surface 40 and a canopy 44 above the trunk 42 in which the crop 46 is produced, as best shown in FIG. 2. In FIGS. 3-6, the plants 28 are vines that are grown in a vineyard (as the agricultural area 20), with the plants 28 having a trunk 42 that extends upward from the ground surface 40 and a canopy 44 above the trunk 42 in which the crop 46 is produced. As best shown in FIG. 4, in a typical vineyard 26 the plants 28 of the vineyard 20 are supported by a plant support structure 48 comprising a plurality of spaced apart posts 50 which are mounted in the surface 40 (generally along or defining the rows 26) and a plurality of wires 51 which extend between the posts 50 to support the plants 26 as they produce the crop 46. As will be readily appreciated by persons who are skilled in the art, the system 10 and method 12 of the present invention can be utilized with a wide variety of different types of agricultural areas 20 with a wide variety of different types of plants 28 that are utilized to grow a wide variety of different crops 46. As set forth in more detail below, the new system 10 and method 12 utilize the upwardly extending trunks 42, posts 50 or other upwardly extending members 52 (i.e., such as stakes, poles, rods or other items which are placed in the area 20 for the purpose of utilizing the system 10 and method 12 of the present invention. The trunks 42, posts 50 and upwardly extending members 52, which are collectively referred to herein as path markers 54 (examples of which are shown in FIGS. 7-11), are utilized to safely, effectively and efficiently guide the autonomous vehicle 14 along the path 18 in the intended/desired direction of travel DOT1 as it moves, with or without a towed vehicle 16, through an agricultural area 20. In addition, although the figures and description herein are primarily directed to the new system 10 and method 12 being utilized with an autonomous vehicle 14 (such as the tractor) that tows a towed vehicle 16 in an agricultural area 20, with the path 18 being defined as being between adjacent parallel or nearly parallel rows 26 of plants 28 or posts 50 (as shown in FIGS. 1-9), persons who are skilled in the art will readily appreciate that the present invention is not so limited. For instance, the system 10 and method 12 can be utilized with specially positioned upwardly extending members 52 as the path markers 54, as shown in FIGS. 10-12. In addition, the new system 10 and method 12 can be utilized in an agricultural area 20, or other areas, that has raised mounds of soil or upwardly extending barriers, such as fences, walls or the like, or other materials or items which extend above the nominal ground or other surface 40 of the area 20 to define a row 26. More specifically, the new navigation system 10 and method 12 for use with an autonomous vehicle 14 is configured for use in an agricultural field 20 having a plurality of rows 26 of plants 28, plant supports (i.e., posts 50), specially positioned upwardly extending members 52 or any other upwardly extending items as path markers 54 that are utilized by the navigation system 10 and method 12 to guide the autonomous vehicle 14 through the agricultural area 20 on a desired path 18 in the intended/desired direction of travel DOT1.

With regard to the example shown in FIGS. 3-5, the autonomous vehicle 14 is a tractor and the towed vehicle 16 is a sprayer having spraying arm 56 with a plurality of spraying devices that are configured to spray fluid onto the surface 40 of the area 20 (which is an agricultural field) or a gas, such as a fumigant, onto the surface 40 and/or plants 28. In FIG. 3, the autonomous vehicle 14 is properly towing the sprayer 16 along the path 18 in the intended/desired direction of travel DOT1. The example sprayer 16 comprises a frame or platform 58 that is connected to, directly or indirectly, the autonomous vehicle 14 by the towing mechanism 24, a storage tank 60 that stores the liquid or gas that is sprayed and a pair of wheels 62 that are rotatably connected to the platform 58 to allow the sprayer 16 to move across the surface 40 as it is being towed by the autonomous vehicle 14. In FIG. 5, a tire associated with one of the wheels 62 of the sprayer 16 has failed, causing the sprayer 16 to no longer move as it should, creating a malfunctioning condition 22 for the sprayer 16. As will be readily appreciated by persons who are skilled in the art, the flat tire of the wheel 62 will cause the sprayer 16 to not achieve the objective for which the sprayer 16 is being towed by the autonomous vehicle 14, namely spray fluid in the desired direction. In addition to the incorrect spraying, the malfunctioning condition 22 of the flat tire will create a tugging force of the autonomous vehicle 14 that is likely to cause the autonomous vehicle 14 to move or try to deviate from its intended/desired direction of travel DOT1 to an unintended/undesired direction of travel DOT2 (as shown in FIG. 5) that, if not corrected or compensated for, is likely to cause the autonomous vehicle 14 and/or the sprayer 16 to move in a direction that could damage the vehicles 14/16 and/or the plants 28 in one or more of the rows 26 of plants 28. In FIG. 6, the autonomous vehicle 14 has adjusted its steering operations in order to compensate for the misdirectional tugging force being applied to the autonomous vehicle 14 due to the malfunctioning condition 22 being experienced by the towed vehicle 16 by turning the front wheels thereof, which are used for steering, in a direction that will result in the autonomous vehicle 14 moving (or at least attempting to move) in the intended/desired direction of travel DOT1 while the autonomous vehicle 14 drags the broken towed vehicle 16 along the path 18. Although the autonomous vehicle 14 is moving in the correct direction, the malfunctioning condition 22 is causing the spraying work of the sprayer 16 to be improperly performed.

The autonomous vehicle 14 has a control system 64 that is utilized to operatively control the movement of the autonomous vehicle 14 as it moves through the agricultural area 20. With regard to FIG. 6, although the towed vehicle 16 has a malfunctioning condition 22, the control system 64 of the autonomous vehicle 14 is attempting to operate the autonomous vehicle 14 in a manner that compensates for the malfunctioning condition 22. As will be readily appreciated by persons skilled in the art, however, the compensating actions taken by the control system 64 of the autonomous vehicle 14 are not likely to prevent the sprayer 16 from spraying fluid incorrectly (i.e., spray in the wrong direction). If the sprayer 16 continues to move with the malfunctioning condition 22, the sprayer 16 could overturn, which could damage the sprayer 16 and/or towing mechanism 24 and/or, cause the fluid inside the tank 60 to spill onto the surface 40, which would waste the fluid and potentially harm the plants 28 that are growing near where the sprayer 16 overturns. As set forth in more detail below, in addition to the system 10 and method 12 of the present invention being used for navigation, they are also configured to detect the malfunctioning condition 22 of the towed vehicle 16 (i.e., the sprayer) and send information to the control system 64 pertaining to the malfunctioning condition 22, preferably before the problem is severe, so immediate action can be taken to prevent further damage to the towed vehicle 16 and any damage to the autonomous vehicle 14, area 20, plants 28 and any objects and/or persons in or near the agricultural area 20.

The towing mechanism 24 can be of the type that are commonly used for towing operations to allow a autonomous vehicle 14 to tow a towed vehicle 16 along a path 18 in an agricultural area 20. In one simple embodiment, the towing mechanism 24 can be a common tow hitch arrangement having a tow hitch attached to the autonomous vehicle 14 and a cooperatively configured receiver attached to the towed vehicle 16. In other embodiments, such as those shown in the figures, the towing mechanism 24 can comprise various frame members and one or more attachment devices that securely attach, whether removably or fixedly (i.e., welding or the like) the opposite ends of the towing mechanism 24 to the autonomous vehicle 14 and the towed vehicle 16. In other embodiments, the towing mechanism 24 can comprise tow bars, hooks, chains, couplers and the like. The towing mechanism 24 may be or comprise the type that is referred to as a "fifth wheel" or "gooseneck" towing system. Any such towing mechanisms 24 will be generally structured and arranged to tow the towed vehicle 16 in the same direction as the autonomous vehicle 14, namely in the intended/desired direction of travel DOT1 along the path 18. As such, the intended or desired direction of the towed vehicle 16 (hereinafter referred to as the towed direction of travel or "TDOT"), as shown in FIGS. 1 and 3) will be the same as the intended/desired direction of travel DOT1 as the autonomous vehicle 14. When the towed vehicle 16 has a malfunctioning condition 22, the towed direction of travel TDOT of the towed vehicle 16 will vary from that of the autonomous vehicle 14, as shown in FIG. 5. Virtually all towing mechanisms 24 are configured such that one or more components (such as hitches, bars and the like) thereof are aligned with the autonomous vehicle 14 such that when the towed vehicle 16 is in a malfunctioning condition 22, these component(s) can be utilized to indicate that the towed direction of travel TDOT of the towed vehicle 16 does not align with the intended direction of travel DOT1 of the autonomous vehicle 14. For purposes of describing the system 10 and method 12 of the present invention, these directional indicating components of the towing mechanism 24 are referred to as the directional components 66.

For purposes of further describing the present invention, the autonomous vehicle 14 has a steering system 68 and one or more steerable wheels 70 that are operatively controlled by the steering system 68 to allow the autonomous vehicle 14 to move in the desired direction of travel DOT1 along the path 18, as shown in FIGS. 1, 3 and 6. The steering system 68 of a typical autonomous vehicle 14, but not necessary all autonomous vehicles 14, comprises a steering wheel, a steering column, a gear box, a linkage assembly and one or more axles. As well known in the relevant art, in a typical motor vehicle the steering column movably supports the steering wheel, the gear box rotatably connects the steering wheel to the linkage assembly and the linkage assembly converts the movement of the steering wheel, at the gear box, to pivoting movement for steerable wheels 70 which are mounted onto the axle(s) so as to pivot left and right. The linkage assembly can comprise one or more shafts, arms, links, rods, knuckles and the like. As also well known in the relevant art, some steering systems 68 have one or more pumps, reservoirs and hoses or lines that connect one or more components to operate or assist with the operation of the steering system 68, such as is common for hydraulic power steering and the like. Although most presently configured autonomous vehicles 14 utilize a steering system 68 having all or nearly all of the components described above, some of these types of autonomous vehicles 14 may not have a steering wheel or one or more other components that are not necessary for operation of the autonomous vehicle 14 due to the autonomous vehicle 14 not having a driver 48. As will be readily appreciated by persons who are skilled in the relevant art, the system 10 and method 12 of the present invention can be adapted to any type of steering system 68.

As best shown in FIGS. 13-16, the vehicle steering system 68 receives instructions, referred to herein as the steering instructions 72, from the control system 64 of the autonomous vehicle 14. The steering instructions 72 cause the steering system 68 to function in a manner that is appropriate to cause the steerable wheels 70 to move the autonomous vehicle 14 in the intended/desired direction of travel DOT1 along the path 18. In FIGS. 1, 3 and 5-6, the steerable wheels 70 are shown as the pair of front wheels. The power system, such as a motor or the like (not specifically shown), of the autonomous vehicle 14 will deliver power to move the autonomous vehicle 14 to the power wheels 74. In FIGS. 1, 3 and 5-6, the power wheels 74 are the rear wheels, shown as wheels 74a and 74b. Persons who are skilled in the relevant art will readily appreciate that different configurations for the autonomous vehicle 14 are possible and that in some circumstances, such as front-wheeled drive vehicles, the steerable wheels 70 may be the same as the power wheels 74.

With regard to the steerable wheels 70, under normal operating conditions 76 (i.e., not a malfunctioning condition 22), the steerable wheels 70 will be aligned with or otherwise cooperatively positioned with the intended/desired direction of travel DOT1, as shown in FIGS. 1 and 3, such that the autonomous vehicle 14 and the towed vehicle 16, connected by the towing mechanism 24, will move in the intended/desired direction of travel DOT1 along the path 18.

As set forth above and well known in the art, if there is a malfunctioning condition 22 associated with the towed vehicle 16, as shown in FIGS. 5-6, the malfunctioning towed vehicle 16 can cause the autonomous vehicle 14 to move in an unintended/undesired direction of travel DOT2 which, if left unchecked, can damage the vehicles 14/16, objects in or near the area 20 and/or persons in the vehicles 14/16 or other nearby vehicles. Normally, the control system 64 will attempt to keep the autonomous vehicle 14 moving along the intended/desired direction of travel DOT1, if it can, as long as possible by correcting the angle of the steerable wheels 70 to keep the vehicles 14/16 moving along the path 18, as shown in FIG. 5. Eventually, however, the malfunctioning condition 22 is likely to reach a point where the steerable wheels 70 are not able to be sufficiently adjusted to overcome the problems caused by the malfunctioning condition 22, at which time damage, injuries and/or fatalities are likely. The new system 10 and method 12 of the present invention are configured and utilized to notify the control system 64 of the autonomous vehicle 14 that there is a malfunctioning condition 22 associated with the towed vehicle 16 so that appropriate action may be taken to prevent such damage, injuries and/or fatalities.

An autonomous vehicle 14 must have one or more data gathering devices 78, which may comprise cameras, radar, LIDAR or the like, that are configured to be able to sufficiently see or visualize objects in the vehicle's path with enough clarity for one or more computer algorithms or programs, associated with the vehicle's onboard computer, to determine what the object is and whether or not hitting the object presents a danger to the object or autonomous vehicle 14, as described in the Background. In a typical configuration for an autonomous vehicle 14, the computer control system 64 utilizes one or more algorithms or computer programs to make decisions about the object and what action should or should not be taken by the vehicle in response to the object. The algorithms or programs are utilized by an autonomous vehicle 14 must be configured with a base amount of "knowledge" and the ability to "learn" with regard to what objects can be harmed by the autonomous vehicle 14 or damage the vehicle 14 and, possibly, harm the occupants thereof, so the system will operate the vehicle 14 in a manner that avoids colliding with such objects. As described in the prior art referenced in the Background, the configuration and use of such computer control systems 64 and their associated algorithms are generally well known to persons who are skilled in the relevant art.

As set forth in more detail below, the system 10 and method 12 of the present invention comprise a guidance system 80 that is configured to guide the autonomous vehicle 14 through the area 20 along a path 18 that is defined by a plurality of path markers 54. For purposes of the present invention, the guidance system 80 comprises the following: (a) one or more cameras, radar, LIDAR or other data gathering devices 78; (b) a guidance computer 82 that is associated with (such as being part of or connected to) the vehicle's computer control system 64; and (c) one or more appropriately configured computer algorithms, programs or other computer operating instructions (individually and collectively referred to as "guidance programs" 84) which are electronically utilized by or operated by the guidance computer 82, as set forth in FIGS. 13-16. As will be readily appreciated by persons skilled in the art, the data gathering devices 78 for the guidance system 80 can be the same components that are utilized by the autonomous vehicle 14 to avoid collisions or they can be separate, dedicated data gathering devices 78. In either configuration, as set forth in more detail below, the data gathering devices 78 are utilized in the system 10 and method 12 to visually, audibly or otherwise remotely (i.e., in a non-physical contact manner) interact with the path markers 54. In one embodiment, the guidance computer 82 is the same computer which is utilized for the control system 64 that controls the movement and operation of the autonomous vehicle 14 to avoid contact with objects. In other embodiments, the guidance computer 82 can be a separate computer that is dedicated for use with the guidance system 80 that electronically interacts with the data gathering devices 78. As summarized in FIGS. 15-16, the guidance programs 84 analyze the data collected from the data gathering devices 78 to determine the path 18 along which the autonomous vehicle 14 should be moving in order for the autonomous vehicle 14 to move in the intended/desired direction of travel DOT1. As also set forth in more detail below, the path markers 54, which are utilized with the system 10 and method 12 to define the path 18, are the targets that the data gathering devices 78 are looking for as they scan the relevant portion of the area 20. The locations of the various path markers 54 are analyzed or processed by the guidance programs 84 of the guidance computer 82 to keep the autonomous vehicle 14 moving in the intended/desired direction of travel DOT1.

With regard to use of the new system 10 and method 12 of the present invention in an agricultural area 20, the data gathering devices 78 are utilized to guide the autonomous vehicle 14 on the path 18 along or between rows 26 of plants 28, posts 50, upwardly extending members 52 or other path markers 54. The system 10 and method 12 of the present invention utilize the data gathering devices 78 to "see" all or a portion of the position of the trunks 42 of the plants 28, the posts 50 of the plant support structures 48, the upwardly extending members 52 or other path markers 54 that define the path 18 so the guidance system 80 can send information, referred to as positioning information 86, to the control system 64 that will send steering instructions 72 to the vehicle steering system 68 which will operate the one or more steerable wheels 70 to guide the autonomous vehicle 14 along path 18 in the intended/desired direction of travel DOT1. More specifically, the system 10 and method 12 of the present invention has a guidance system 80 that utilizes at least one data gathering device 78, which is electronically connected to the guidance computer 82 associated with control system 64 of the autonomous vehicle 14, to engage (i.e., "view") the path markers 54 in the area 20 to determine the correct or optimum positioning and movement of the autonomous vehicle 14 (with or without a towed vehicle 16 being towed thereby). The positioning information 86 determined from the data collected by the data gathering devices 78 is processed by the guidance programs 84 of the guidance computer 82, as shown in FIGS. 13-16. Based on the processed positioning information 86, the control system 64 sends steering instructions 72 to the vehicle steering system 68 to operatively control the one or more steerable wheels 70 in a manner that moves autonomous vehicle 14 along the path 18 in the intended/desired direction of travel DOT1 in order to accomplish a desired work objective in the area 20. In some circumstances, the work objective may be just to move the autonomous vehicle 14 through the area 20.

As set forth in FIG. 13, a preferred configuration of the system 10 of the present invention generally comprises an autonomous vehicle 14, having a steering system 68 operatively connected to one or more steerable wheels 70, and an area 20 (such as an agricultural area) in which the autonomous vehicle 14 will move to accomplish the desired work objective. Associated with the autonomous vehicle 14 is a control system 64 that is configured to send steering instructions 72 to the steering system 68 to control the one or more steerable wheels 70 in a manner which directs the autonomous vehicle 14 to move along the path 18 in an intended/desired direction of travel DOT1 and a guidance system 80 comprising one or more data gathering devices 78 and a guidance computer 82, having an appropriately configured guidance program 84, to determine the positioning information 86 which will be utilized by the control system 64 to generate the necessary steering instructions 72. As also shown in FIGS. 13-16 and set forth in more detail below, the system 10 and method 12 of the present invention also comprises one or more directional sensors 88, one or more notification devices 90 and an operating program 92 that electronically interconnects the directional sensors 88 and notification devices 90. The directional sensors 88 are connected to or otherwise associated with at least one of the steerable wheels 70 of the autonomous vehicle 14 and are configured to confirm the direction the autonomous vehicle 14 is moving and to monitor for any malfunctioning condition 22 through a deviation in the normal operating conditions 76 of the autonomous vehicle 14. The notification devices 90 are configured to electronically notify the control system 64 of the movement of the autonomous vehicle 14 and any deviation in the normal operating conditions 76, such as due to a malfunctioning condition 22. As will be readily appreciated by persons skilled in the art, the autonomous vehicle 14 can be of the type of vehicle set forth in the above-described examples or, as also set forth above, any other type of autonomous vehicle 14. The guidance system 80 utilizes the one or more data gathering devices 78 and the guidance computer 82, having the necessary guidance programs 84, to determine the positioning information 86 that is electronically or otherwise forwarded to the control system 64. The control system 64 utilizes the positioning information 86 to determine the necessary steering instructions 72 for the vehicle steering system 68 to control the steerable wheels 70 in a manner which guides the autonomous vehicle 14 on or along the path 18 and utilizes the directional sensors 88, notification devices 90 and operating program 92 to confirm the autonomous vehicle 14 is on the correct path 18 and moving in the intended/desired direction of travel DOT1 and to notify the control system 64 if the autonomous vehicle 14 is not on the correct path 18 and/or not moving in the intended/desired direction of travel DOT1.

An alternative configuration of the system 10 of the present invention, shown in FIG. 14, generally comprises an autonomous vehicle 14, a towed vehicle 16, a towing mechanism 24 interconnecting the autonomous vehicle 14 and the towed vehicle 16 and an area 20 (such as an agricultural area) in which both the autonomous vehicle 14 and towed vehicle 16 will move to accomplish the desired work objective. Associated with the autonomous vehicle 14 is a control system 64 that is configured to send steering instructions 72 to the steering system 68 to control the one or more steerable wheels 70 in a manner which directs the autonomous vehicle 14 and towed vehicle 16 to move along the path 18 in an intended/desired direction of travel DOT1 and a guidance system 80 comprising one or more data gathering devices 78 and a guidance computer 82, having an appropriately configured guidance program 84, to determine the positioning information 86 which will be utilized by the control system 68 to generate the necessary steering instructions 72. The system 10 of this embodiment also has one or more directional sensors 88, one or more notification devices 90 and an operating program 92 that electronically interconnects the directional sensors 88 and notification devices 90. The directional sensors 88, which are connected to or otherwise associated with at least one of the following components: (1) a steerable wheel 70 of the autonomous vehicle 14; (2) a directional component 61 of the towing mechanism 24; and/or (3) the towed vehicle 16, are utilized to confirm the direction that the autonomous vehicle 14 is moving and to monitor for any malfunctioning condition 22 through a deviation in the normal operating conditions 76 of the autonomous vehicle 14. The notification devices 90 electronically notify the control system 64 of the movement of the autonomous vehicle 14 and of any deviation in the normal operating conditions 76, such as may occur due to a malfunctioning condition 22. The autonomous vehicle 14, towed vehicle 16 and towing mechanism 24 can be of the type of the above-described examples or, as also set forth above, any other type of autonomous vehicle 14, towed vehicle 16 and towing mechanism 24. The guidance system 80 utilizes the one or more data gathering devices 78 and the guidance computer 82, having guidance programs 84, to determine the positioning information 86 that is electronically or otherwise forwarded to the control system 64. The control system 64 utilizes the positioning information 86 to determine the necessary steering instructions 72 for the vehicle steering system 68 to control the steerable wheels 70 in a manner which guides the autonomous vehicle 14 and the towed vehicle 16 on or along the path 18 and utilizes the directional sensors 88, notification devices 90 and operating program 92 to confirm the autonomous vehicle 14 (and by extension the towed vehicle 16) is on the correct path 18 and moving in the intended/desired direction of travel DOT1 and to notify the control system 64 if the autonomous vehicle 14 and/or towed vehicle 16 is not on the correct path 18 and/or not moving in the intended/desired direction of travel DOT1.

The guidance system 80 utilizes path markers 54 to accurately guide the autonomous vehicle 14, and as applicable the towed vehicle 16, along the path 18 in the area 20. For the system 10 and method 12 of the present invention, the path markers 54 are either: (1) preexisting components in the area 20, such as the trunks 42 of plants 28, posts 50 of plant support structures 48 and the like which define the path 18; (2) upwardly extending members 52 that are specially placed in the area 20 to define the path 18; or (3) various combinations of such pre-existing components and specially placed upwardly extending members 52, as best shown in FIGS. 2, 4 and 7-12. With regard to agricultural areas 20 that have rows 26 of plants 28, as shown in FIGS. 1-6, the trunks 42 of the plants 28 are positioned in a spaced apart relationship in an amount referred to as plant spacing 94 (shown in FIGS. 2 and 4), as measured between adjacent trunks 42, which is generally or at least relatively uniform throughout an area 20 for a particular type of plant 28. As set forth above, FIG. 2 shows the plants 28 being trees in an orchard and FIG. 4 shows the plants 28 as vines in a vineyard. As well known in the relevant art, the trunks 42 of the plants 28 generally extend in an upwardly direction above the surface 40 (i.e., the ground) of the area 20 in which they are planted, as shown in FIGS. 2 and 4, to form the plant rows 26 (which may be linear or curvilinear). The posts 50 of the plant support structure 48, when utilized, are also positioned in a spaced apart relationship in an amount referred to as post spacing 96 (shown in FIGS. 3-6), as measured between adjacent posts 50, which is also generally or at least relatively uniform throughout an area 20 for a particular type of plant support structure 48 and/or plant 28. As well known in the relevant art, the posts 50 of the plant support structure 48 generally extend in an upwardly direction above the surface 40 (i.e., the ground) of the area 20 in which they are planted, as shown in FIG. 4, to define a post row 98, as shown in the uppermost portion of FIG. 3 (with plants 28 removed). As with the plant rows 26, the post row 96 may be linear or curvilinear. Typically, but not always, the post rows 98 also define or, or at least generally define, the rows 26 of plants 28. FIG. 12 shows an area 20 having a plurality of specially positioned upwardly extending members 52, which can be used with or without plants 28 and/or with or without a plant support structure 48 (i.e., with or without trunks 42 or posts 50). The upwardly extending members 52 are positioned in a member row 100 and are disposed in spaced apart relationship with each other in an amount that is referred to as member spacing 102, which is the distance between adjacent upwardly extending members 52 (which distance may or may not be uniform throughout the area 20). As with the trunks 42 and posts 50, the upwardly extending members 52 generally extend in an upwardly direction above the surface 40 (i.e., the ground) of the area 20 in which they are positioned, as shown in FIG. 12, to define member row 100. For purposes of describing the system 10 and method 12 of the present invention, the plant row 26, post row 98 and member row 100 (and the like) are collectively referred to as guidance rows 104. Each guidance row 104 comprises a plurality of spaced apart path markers 54 and, as will be readily appreciated by persons who are skilled in the art, any particular guidance row 104 may be linear or curvilinear. As set forth in more detail below, the system 10 and method 12 of the present invention utilizes at least one guidance row 104, as defined by upwardly extending trunks 42, posts 50 and/or upwardly extending members 52 (collectively, the path markers 54), to navigate an autonomous vehicle 14 through an area 20.

Figure 7:
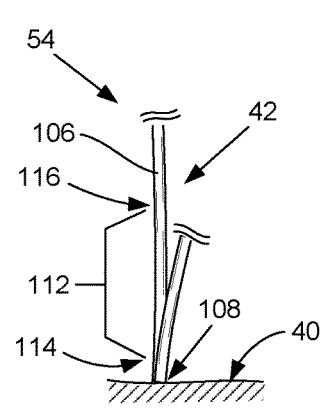
FIG. 7 is an isolated side view of the trunk one of the trees of FIG. 2 showing use of a section of the trunk as a path marker to guide an autonomous vehicle through an orchard in which the trunk is located.
Figure 8:
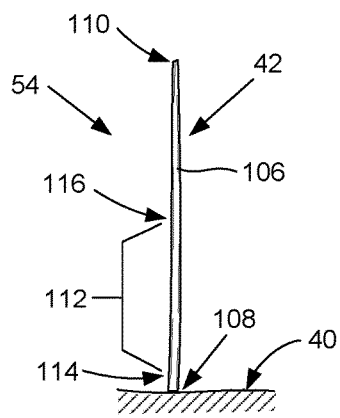
FIG. 8 is an isolated side view of the trunk one of the vines of FIG. 4 showing use of a section of the trunk as a path marker to guide an autonomous vehicle through a vineyard in which the trunk is located.
Figure 9:
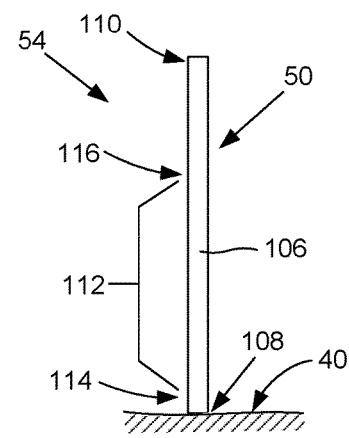
FIG. 9 is an isolated side view of one of the posts of FIG. 4 showing use of a section of the post as a path marker to guide an autonomous vehicle through a vineyard in which the post is located.
Figure 10:
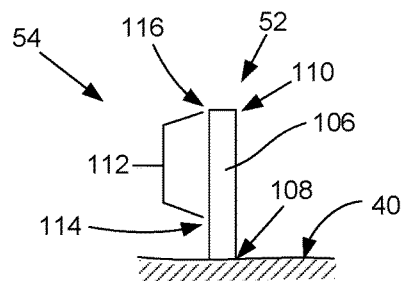
FIG. 10 is a side view of a specially positioned marking member that is utilized as a path marker to guide an autonomous vehicle through an agricultural area in which the trunk is located, with a portion of the member being utilized as a marker segment.

Each path marker 54 has a body 106 extending upward from the surface 40, which is often the ground, of the area 20, with a first or lower end 108 of the body 106 at the surface 40 and a second or upward end 110 extending above the surface 40, as best shown in FIGS. 8-10 (with regard to FIG. 7, the second/upward end 110 of the trunk 42 of a tree, as the plant 28, can be relatively indeterminate). Generally, but not always, a portion of the path marker 54 may extend below the surface 40. For use as part of the system 10 and method 12 of the present invention, only the portion of the body 106 of the path marker 54 which is at or above the surface 40 is considered the first/lower end 108 that is useful as part of the guidance row 104 (i.e., the portion below the surface 40, if any, is not utilized). In one embodiment, the system 10 and method 12 utilizes the entire vertical portion of the body 106 of the path marker 54 that extends above the surface 40, which is between the first/lower end 106 and the second/upper end 108 thereof, for navigation purposes. In most embodiments, however, it is likely the system 10 and method 12 will only utilize a portion of the body 106 of the path markers 54 that extends above the surface 40. The portion of the path markers 54 that is utilized in the system 10 and method 12 of the present invention, whether it is the entire body 106 or just part of the body 106, is referred to herein as a marker segment 112, as best shown in FIGS. 7-11. As shown in these figures, the marker segment 112 is a vertical portion of the body 106 of the path marker 54. When the entire vertical portion of the body 106 is utilized, the marker segment 112 extends between the first/lower end 108 and the second/upper end 110 of the body 106. However, in many configurations of the new system 10 and method 12, the marker segment 112 is a vertically disposed portion of the body 106 of a path marker 54 that begins at a point above (i.e., in spaced apart relation to) the first/lower end 108 of the body 106 and ends at a point below (i.e., in spaced apart relation to) the second/upper end 110 of the body 106. More specifically, in this configuration of the present invention, the system 10 and method 12 utilize a marker section 112 having a first or lower end 114 that is in spaced apart relation above the first/lower end 108 of the body 106 (and, as such, in spaced apart relation above the surface 40) and a second or upper end 116 that is either at or in spaced apart relation below the second/upper end 110 of the body 106, as shown in FIGS. 7-9. In other configurations, one end 114/116 of the path segment 112 is at, respectively, either the first/lower end 108 or the second/upper end 110 of the path marker 54. For instance, in FIGS. 7-9, the first/lower end 114 of the marker segment 112 is above the first/lower end 108 of the body 106 of the path marker 54 (i.e., a trunk 42 or post 50) and the second/upper end 116 of the marker segment 112 is below the second/upper end 110 of the body 106 of the path marker 54. In FIG. 10, the first/lower end 114 of the marker segment 112 is above the first/lower end 108 of the body 106 of the path marker 54 (which is an upwardly extending member 52) and the second/upper end 116 of the marker segment 112 is at the second/upper end 110 of the body 106 of the path marker 54. In FIG. 11, the first/lower end 114 of the marker segment 112 is at the first/lower end 108 of the body 106 of the path marker 54 (i.e, the upwardly extending member 52) and the second/upper end 116 of the marker segment 112 is at the second/upper end 110 of the body 106 of the path marker 54, thereby encompassing the entire body 106 of the path marker 54. As such, any portion of or the entire path marker 54, whether it is a trunk 42, post 50 or upwardly extending member 52, may function as the marker segment 112 that is utilized for the navigation system 10 and method 12.

In certain configurations of the present invention, the system 10 and method 12 will utilize at least one marking device 118, as shown in FIG. 12, as the marker segment 112 (instead of a portion of the body 106 of the path marker 54). In the preferred configurations, the marking device 18 is attached to, integral with, positioned at or otherwise associated with a path marker 54 and selected to assist the autonomous vehicle 14 being able to navigate through the area 20. As with some embodiments described above, the first/lower end 114 of the marking device 118 will be in spaced apart relation to the first/lower end 108 of the path marker 54 and the second/upper end 116 of the marking device 118 will either be at or in spaced apart relation below the second/upper end 110 of the path marker 54, as shown in FIG. 12. The marking device 118 can be a reflector, sensor, transmitter, light source, heat source or other device which is configured to be easily visualized by, read by or otherwise engaged by the data gathering devices 78 of the guidance system 80 of the autonomous vehicle 14 as it moves through the area 20. In one embodiment, the system 10 and method 12 only utilize the marking device 118 to guide the autonomous vehicle 14 through the area 20. In other embodiments, the system 10 and method 12 can utilize both a marker segment 112 and a marking device 118, either concurrently or alternatively, to guide the autonomous vehicle 14 through the area 20 along 18.

Figure 17:
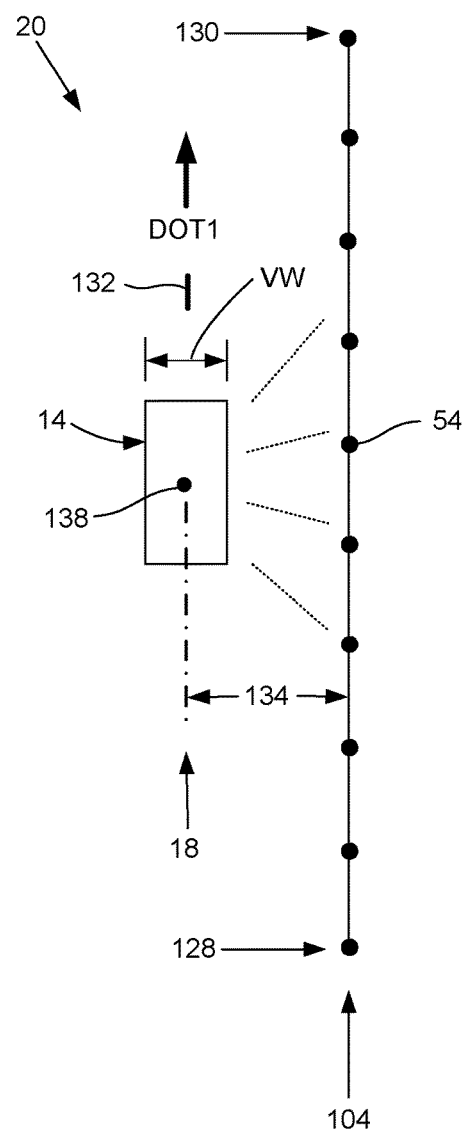
FIG. 17 is an idealized version of an area having a single guidance row with an autonomous vehicle shown engaging the path markers that define the guidance row.
Figure 18:
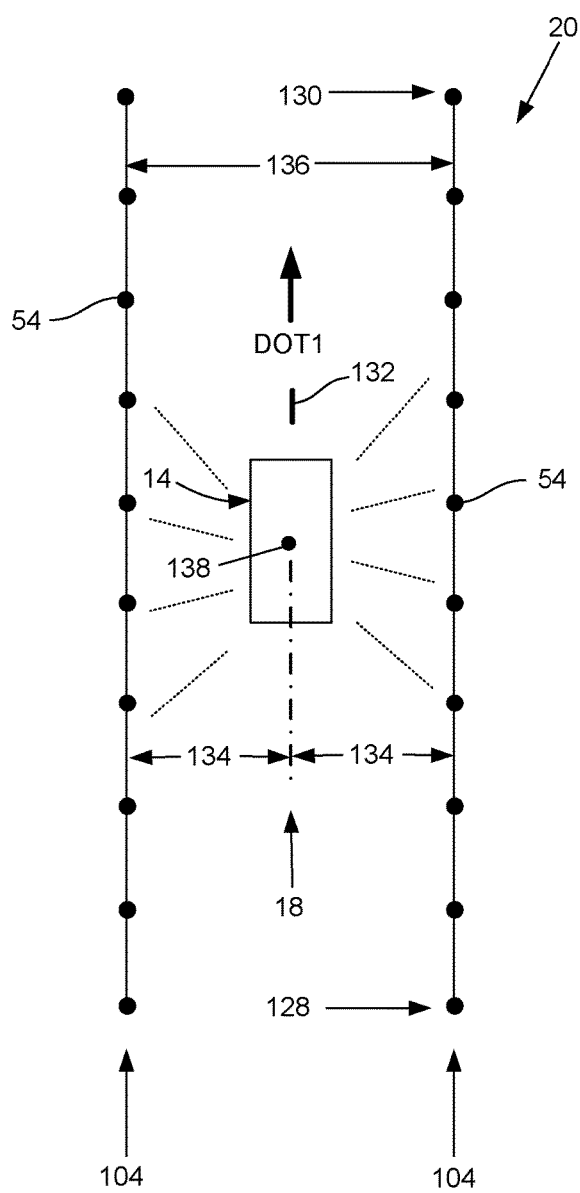
FIG. 18 is an idealized version of an area having a two spaced apart guidance rows with an autonomous vehicle shown engaging the path markers that define the two guidance rows.

As the autonomous vehicle 14 moves through the area 20, one or more of the data gathering devices 78 will visually (i.e., LIDAR—pulsed laser light) or audibly (i.e., radar—sonic pulses) connect with or otherwise operatively engage the marker segments 112 of the path markers 54 that define the guidance row 110 in an area 20. The guidance computer 82 utilizes the location of these marker segments 112 of the various path markers 54 to produce positioning information 86 which is utilized to calculate the steering instructions 72 that are transmitted to the steering system 68 to control the one or more steerable wheels 79 to move the autonomous vehicle 14 along the desired path 18, along a single guidance row 110, as shown in FIG. 17, or between a pair of adjacent guidance rows 110, as shown in FIG. 18, so the autonomous vehicle 14 can accomplish a desired work objective. Specifically, once the steering instructions 72 are determined from the positioning information 86 of the path markers 54, which positioning information 86 is calculated by the guidance computer 82 of the guidance system 80 using the one or more data gathering devices 78, the control system 14 of the autonomous vehicle 14 will send the steering instructions 72 to the vehicle steering system 68 to direct the steerable wheels 70 so they will be operatively positioned in a manner necessary to move the autonomous vehicle 14 along the path 18 in the intended/desired direction of travel DOT1 so the autonomous vehicle 14 may accomplish the desired work objective.

As will be readily appreciated by persons who are skilled in the art, the one or more steerable wheels 70 move in a direction that is controlled by the vehicle steering system 68 of the autonomous vehicle 14 in order to achieve the objective of the steering instructions 72, such as to move the autonomous vehicle 14 straight, at an angle, around a curve or etc., with regard to the intended/desired direction of travel DOT1. Under normal operating conditions 76, the steerable wheels 70, and as applicable the directional components 66 of the towing system 24 and towed vehicle 16, will be moving in the same or nearly the same direction as that which is intended/desired by the steering instructions 72. For instance, if the steering instructions 72 to the vehicle steering system 68 are to move the autonomous vehicle 14 in a straight intended/desired direction of travel DOT1 along the path 18, the steerable wheels 70, directional components 66 of the towing mechanism 24 and the towed vehicle 16 will also be positioned to move in a straight direction. Likewise, if the autonomous vehicle 14 is turning or otherwise not moving straight, under normal operating conditions 76 the steerable wheels 70, the directional components 66 of the towing mechanism 24 and the towed vehicle 16 will be at the same angle to make the turn. The directional sensors 88 are utilized to monitor the direction of one or more of the steerable wheels 70, and as applicable the directional components 66 of the towing mechanism 24 and/or the towed vehicle 16, to confirm the autonomous vehicle 14 is in its normal operating condition 76 or to notify control system 64 that it/they are not operating under normal operating conditions 76, which is likely to be due to a malfunctioning condition 22 associated with one or more of the autonomous vehicle 14, towing mechanism 24 and/or towed vehicle 16.

The directional sensors 88 are structured and arranged to determine the directional position 120 of one or more of the steerable wheels 70, the towing mechanism 24 and/or the towed vehicle 16. As shown in FIGS. 13-16, in one configuration, the directional sensors 88 are attached to or otherwise associated with one or more of the steerable wheels 70 and configured to determine the directional position 120a in which the one or more steerable wheels 70 are moving (such as whether the steerable wheels 70 are straight or angled). In another configuration, the directional sensors 88 are attached to or otherwise associated with one or more directional components 66 of the towing mechanism 24 to determine the directional position 120b of the towing mechanism 24. In yet another configuration, the directional sensors 88 will be attached to or otherwise associated with the towed vehicle 16 to determine the directional position 120c of the towed vehicle 16. As set forth in more detail below and summarized in FIGS. 13-16, the directional position 120 of one or more of the steerable wheels 70, directional components 66 and towed vehicle 16 are compared to the direction set forth in the steering instructions 72 for the vehicle steering system 68 of the autonomous vehicle 14 to see if they match or, if not, if they match within an acceptable or allowed amount of deviation, which is referred to herein as the allowable parameter 122.

The directional sensors 88 can be a linear potentiometer, hydraulic fluid pressure sensors, ultra-sonic sensors, mechanical sensors or a wide range of other types of sensors that are or can be utilized to determine the directional positions 120 of a steerable wheel 70, a directional component 66 of the towing mechanism 24 and/or a towed vehicle 16 so the information can be utilized to determine if the directional positions 120 do not match the steering instructions 72 which are utilized to control the vehicle steering system 68. As well known to persons who are skilled in the relevant arts, the directional sensors 88 can be fixedly or removedly attached to the steerable wheels 70, directional component 66 or towed vehicle 16 or the directional sensors 88 can be integrally formed with one or more of the components that comprise or otherwise form the steerable wheels 70, directional component 66 or towed vehicle 16. In any such, configuration, the directional sensors 88 must be configured to determine the actual directional positions 120 of the steerable wheels 70, the directional component 66 and/or the towed vehicle 16 and transmit information pertaining to the directional positions 120 to the operating program 92 for processing to determine if it is necessary to send a signal to the notification devices 90 to inform the control system 64 of the autonomous vehicle 14 that there is a malfunctioning condition 22. An example of a system and method for detecting improper operation of a vehicle or implement while being towed that can be utilized with the navigation system 10 and method 12 is set forth in co-pending patent application U.S. patent application Ser. No. 16/677,170, which is also by the present inventor.

The notification device 90 is structured and arranged to display, sound or otherwise send a signal, hereinafter the directional indicator signal 124, to the control system 64 of the autonomous vehicle 14 with regard to the directional positions 120 of the steerable wheels 70, the directional component 66 and/or the towed vehicle 16. In one embodiment, the notification device 90 is configured to send the directional indicator signal 124 to the control system 64 only when the operating program 92 determines that there is a malfunctioning condition 22 and, therefore, action should be taken to avoid damage, injuries and/or fatalities. In another configuration, the notification device 90 can be configured to continuously, or at least intermittently, indicate to control system 52 the status of the directional position 120 of the autonomous vehicle 14 and/or, as may be applicable, the directional component 66 of the towing mechanism 24 or the towed vehicle 16. In this configuration, the directional indicator signal 124 will typically indicate that each of the utilized directional sensors 88 have directional positions 120 for the steerable wheels 70, the directional component 66 and/or the towed vehicle 16 that indicate it/they are moving as it/they should for the normal operating conditions 80, but will change the display, sound or other signal when there is a malfunctioning condition 22. Preferably, the notification device 90 is also configured to send some type of electrical signal, or other type of signal, to the control system 64 of the autonomous vehicle 14 that will cause the autonomous vehicle 14 to shut down and communicate its shut-down status to a person or persons who are overseeing the operation of the autonomous vehicle 14 via a radio, cellular, satellite or other communication system.

The operating program 92 is structured and arranged to interconnect the directional sensors 88, whether associated with the steerable wheels 70, the directional component 66 and/or the towed vehicle 16, and the notification devices 90 to process one or more of the directional positions 120 to determine if there is a malfunctioning condition 22 that should cause the control system 52 to take action (referred to as appropriate action 126) to prevent damage, injuries and/or fatalities. More specifically, the operating program 92 receives the directional position 120a of one or more the steerable wheels 70, the directional position 120b of the directional components 66 of the towing system 24 and/or the directional position 120c of the towed vehicle 16 and analyzes the positional data to determine if there is a malfunctioning condition 22 which is associated with the autonomous vehicle 14 or total vehicle 16. The operating program 92 is also connected (mechanically, electronically, pneumatically or the like) to the vehicle steering system 68 so as to also receive the steering instructions 72 that are directed to the vehicle steering system 68 to determine the intended/desired direction of travel DOT1 which is expected for the normal operating conditions 80.

When an autonomous vehicle 14 that is configured with the system 10 of the present invention is placed in an area 20 having one or more guidance rows 104, comprising a plurality of adjacent (lengthwise along the guidance row 104) path markers 54, the data gathering devices 78 will operatively engage the marker segment 112 of the path markers 54 in a manner consistent with the type of data gathering device 78 being utilized. For instance, cameras and LIDAR systems will "visualize" (by capturing an image or by using light in the form of a pulsed laser) the marker segments 112 to determine the location of the path markers 54 or radar systems will audibly (sonic pulses) contact the marker segments 112 to determine the location of the path markers 54, which locations are the positioning information 86. The use of cameras, LIDAR and/or radar to operatively contact and determine the location of an object is generally well known in the relevant arts. The guidance computer 82, which can be the same computer as utilized for the control system 64, processes the positioning information 86. The control system 64 utilized the positioning information 86 to determine the necessary steering instructions 72 that will operate the steering system 68 and steerable wheels 70 to move the autonomous vehicle 14 along the path 18 in the intended/desired direction of travel DOT1. This operation of the guidance system 80 and steering system 68 will continue as the autonomous vehicle 14 is moved, by the motor-driven power wheels 74, along the path 18 in the area 20. By continually engaging and reading the location of the path markers 54, the autonomous vehicle 14 can move itself along the path 18 along a guidance row 104 (FIG. 17) and/or between pairs of adjacent guidance rows 104 (FIG. 18).

Figure 15:
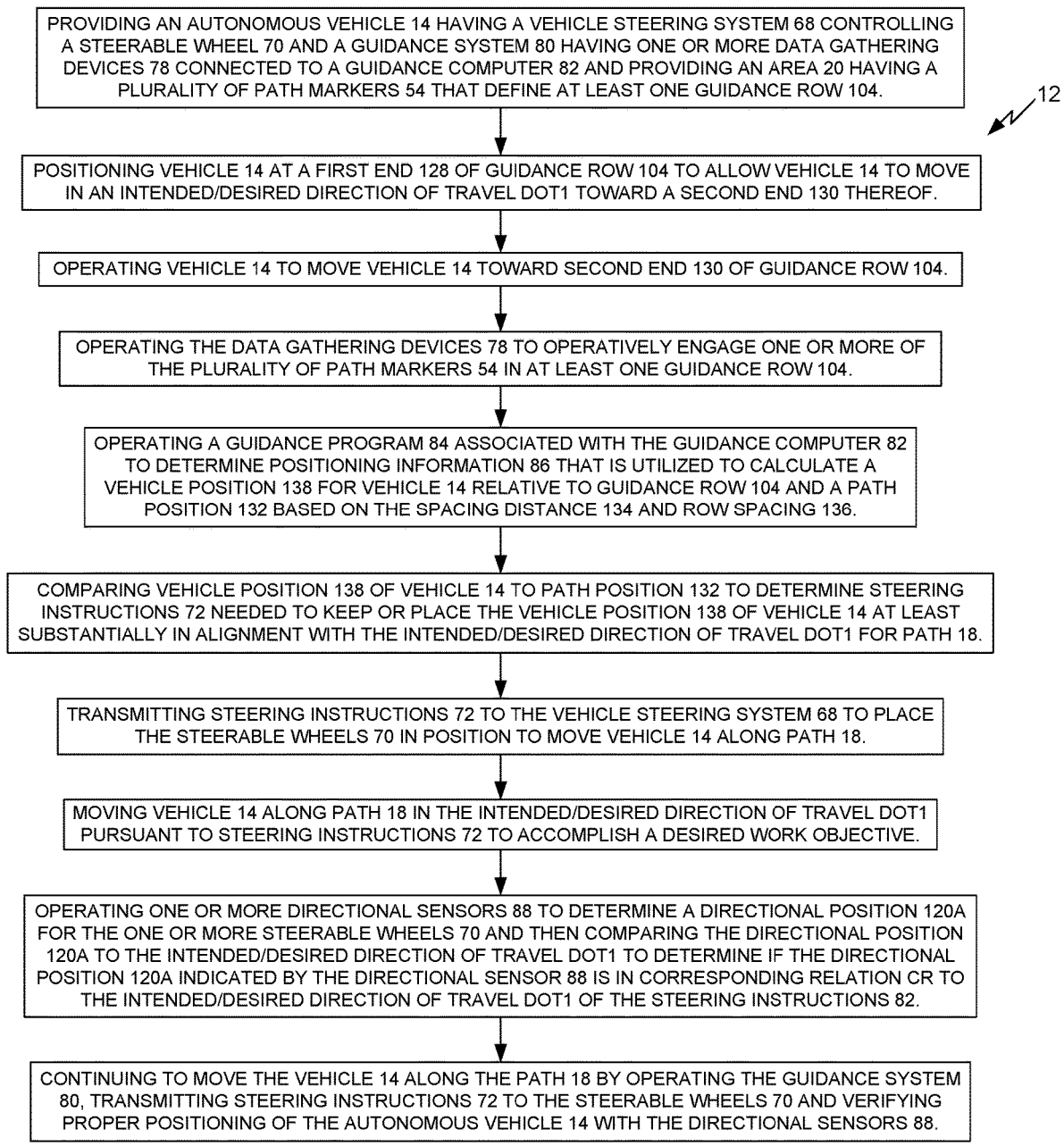
FIG. 15 is a flow chart summarizing one of the preferred configurations of a navigation method for navigating an autonomous vehicle along a path through an agricultural area.
Figure 16:
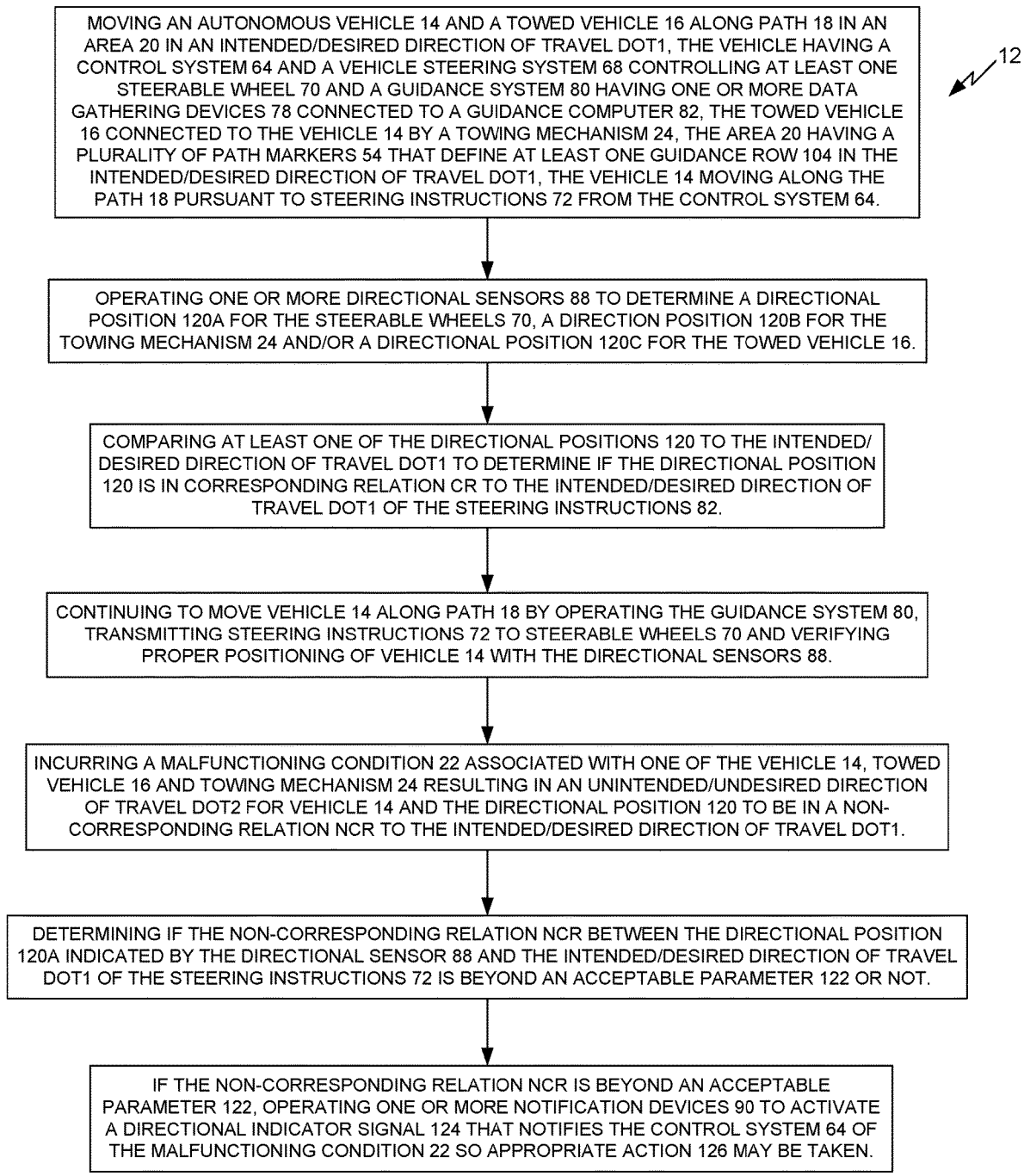
FIG. 16 is a flow chart summarizing an alternative configuration for the navigation method of the present invention showing use of the method when the autonomous vehicle is towing a towed vehicle and one of the autonomous vehicle or towed vehicle incurs a malfunctioning condition.

As set forth in FIGS. 15-16, the operating program 92 accomplishes its objectives by comparing the intended/desired direction of travel DOT1, as set forth in the steering instructions 72 under normal operating conditions 76, to the directional positions 120 determined by the directional sensors 90. Under normal operating conditions 76, as shown in FIGS. 1 and 3, the directional position 120a of one or more of the steerable wheels 70, the directional position 120b of one or more of the directional components 66 of the towing system 24 and/or the directional position 120c of the towed vehicle 16 (as determined by directional sensors 90), will be in corresponding relationship or nearly be in corresponding relationship (i.e., within the acceptable parameter 122) with the intended/desired direction of travel DOT1 of the autonomous vehicle 14. For instance, as set forth in the example above, if the intended/desired direction of travel DOT1 of autonomous vehicle 14 is straight, the directional position 120a of the steerable wheels 70, the directional position 120b of the directional components 66 of the towing system 24 and/or the directional position 120c of the towed vehicle 16, depending which one or more these items are being monitored, will also be straight or within the acceptable parameter 122 (which allows for some pre-set amount of variance). Based on this information, the operating program 92 will determine that the autonomous vehicle 14 is operating properly (i.e., not in a malfunctioning condition 22). In contrast, if the item being monitored (i.e., the steerable wheels 70, the directional components 66 of the towing system 24 and/or the towed vehicle 16) is not in corresponding relation with or within the acceptable parameter 122 of the intended/desired direction of travel DOT1, then the operating program 92 will determine that there is a malfunctioning condition 22 and send a directional indicator signal 124 to the notification device 90 to encourage or cause the control system 64 to take appropriate action 126, as set forth in FIGS. 15-16.

With regard to FIGS. 17 and 18, the system 10 and method 12 utilize the data gathering devices 78 to determine a path position 132 the autonomous vehicle 14 should take or be on in order to be following the path 18 through the area 20. The path position 132 is determined by the guidance computer 82 is based on an amount of distance, referred to as the spacing distance 134, that the autonomous vehicle 14 should be positioned away from in spaced apart relation to the guidance row 104 (having a plurality of path markers 54) so as to effectively, efficiently and safely move though the area 20. Specifically, the path position 132 will be based on a spacing distance 134 which will allow the autonomous vehicle 14 to accomplish the work objectives for which the autonomous vehicle 14 (and as applicable the towed vehicle 16) is in the area 20, efficiently move through the area and avoid contact with plants 28, plant support structures 48, upwardly extending members 52 and other materials and equipment that are in the area 20. As set forth above, the guidance computer 82 will utilize the data gathering devices 78 to calculate the positioning information 86 from the plurality of path markers 54 that define the guidance row 104 in order to calculate path position 132 and transmit appropriate steering instructions 72 to the vehicle steering system 68 to move the autonomous vehicle 14 along the path 18.

In one embodiment, the spacing distance 134 is a predetermined amount that is provided by the user of the system 10 and method 12 of the present invention and applied by the guidance computer 82. Typically, the user will provide the predetermined amount based on the spacing between the path markers 54 which make up adjacent guidance rows 104 (which spacing is referred to as row spacing 136), the width of the autonomous vehicle 14 and, as applicable, the towed vehicle 16 (the widest of which is referred to as the vehicle width VW, as shown in FIG. 1), and/or other factors which affect the spacing necessary to effectively and efficiently accomplish the objectives of why the autonomous vehicle 14 (and as applicable, the towed vehicle 16) are in the area 20. In another embodiment, which may preferred depending on the uniformity (or lack thereof) of the row spacing 136 between path markers 54 of the guidance rows 104, the guidance computer 82 calculates the spacing distance 134 and, therefore, the path location 132, based a combination of information calculated by the guidance computer 82, using the data gathering devices 78 to calculate the positioning information 86. For instance, if desired, the row spacing 136 can be calculated using the positioning information 86 between adjacent guidance rows 104, the width of the autonomous vehicle 14 and/or the towed vehicle 16 (namely, the vehicle width VW) can be calculated by use of the data gathering devices 78 or the width information can be provided by the user in order to calculate the path position 132 at or near the middle (in one embodiment) of adjacent guidance rows 104 and/or rows of path markers 54, as shown in FIGS. 17-18. Other factors, including but not limited to the shape and size of the plants 28 and/or plant support structures 48, may also influence the desired spacing distance 134 for determining the desired path position 132. The positioning information 86, spacing distance 134, row spacing 136 and other factors, as appropriate, are utilized to determine the steering instructions 72 sent to the steerable wheels 70 by the steering system 68 to direct the autonomous vehicle 14 and, as applicable, towed vehicle 16 to move on a path position 132 along the path 18 adjacent a guidance row 104 or between a pair of adjacent guidance rows 104.

FIG. 15 describes a method 12 of using the new system 10 of the present invention with an autonomous vehicle 14 to navigate the autonomous vehicle 14 through an area 20. The autonomous vehicle 14 has a control system 64 that controls the vehicle steering system 68 to operate one or more steerable wheels 70 to move the autonomous vehicle 14 along a path 18. Initially, the method 12 has the step of providing an autonomous vehicle 14 having a vehicle steering system 68 with at least one steerable wheel 70 being controlled by the vehicle's control system 64 and a guidance system 80 having one or more data gathering devices 78 connected to a guidance computer 82 and providing an area 20 having a plurality of path markers 54 that define at least one guidance row 104, having a first end 128 and a second end 130, along which the autonomous vehicle 14 will move when moving on the path 18. In FIG. 17, the autonomous vehicle 14 is shown operating along a single guidance row 104. In FIG. 18, the autonomous vehicle 14 is shown operating between a pair of adjacent guidance rows 104. The next step is positioning the autonomous vehicle 14 at or near the first end 128 of the guidance row or rows 104 so as to allow the autonomous vehicle 14 to move in an intended/desired direction of travel DOT1 toward the second end 130 of the guidance row or rows 104. The next step is operating the autonomous vehicle 14 so as to move the autonomous vehicle 14 toward the second end 130 of the guidance row 104. The next step is operating the data gathering devices 78 to operatively engage, typically either visually or audibly (using laser light or high-frequency electromagnetic pulses (i.e., LIDAR or radar), one or more of the plurality of path markers 54 in at least one guidance row 104. The next step is operating a guidance program 84 on the guidance computer 82 to determine positioning information 86 that locates the path markers 54 of the guidance row 104 to calculate a vehicle position 138 for the autonomous vehicle 14 relative to the guidance row 104. As further set forth in FIG. 15, the next step in the method 12 is calculating a path position 132, based on the spacing distance 134 and row spacing 136. Often, but not always, a preferred vehicle position 138 is to place the centerline of the autonomous vehicle 14 and/or the towed vehicle 16 at or near the centerline of the row spacing 136 based on the vehicle width VW and row spacing 136. The next step is to compare the vehicle position 132 of the autonomous vehicle 14 to the path position 132 to determine the steering instructions 72, which may be an adjustment to the previous steering instructions 72, that are needed to keep or place the vehicle position 138 of the autonomous vehicle 14 at least substantially in alignment with the intended/desired direction of travel DOT1 to place the autonomous vehicle 14 on the path 18. The next step is transmitting the steering instructions 72 to the vehicle steering system 68 by the control system 64 in a manner so as to place the one or more steerable wheels 70 in position to move the autonomous vehicle 14 along the path 18 in the intended/desired direction of travel DOT1. The next step in the method 12 is moving the autonomous vehicle 14 along the path 18 in the intended/desired direction of travel DOT1 pursuant to steering instructions 72 provided by the control system 64 under normal operating conditions 76. The next step is operating one or more directional sensors 88 to determine a directional position 120a for the one or more steerable wheels 70 and then comparing the directional position 120a to the intended/desired direction of travel DOT1 to determine if the directional position 120a indicated by the directional sensor 88 is in corresponding relation CR to the intended/desired direction of travel DOT1 directed by steering instructions 82. The next step is continuing to move the autonomous vehicle 14 along the path 18 by operating the guidance system 80, transmitting steering instructions 72 to the steerable wheels 70 and verifying proper positioning of the autonomous vehicle 14 with the directional sensors 88.

A possible next step in the method 12 is incurring a malfunctioning condition 22 that produces an unintended/undesired direction of travel DOT2 for the autonomous vehicle 14. If a malfunctioning condition 22 is incurred, the next step is for the control system 64 to operate the steering system 68 of autonomous vehicle 14 to move the steerable wheels 70 in a manner which aligns movement of the autonomous vehicle 14 with the intended/desired direction of travel DOT1 along the path 18. This will result in the directional position 120a indicated by the directional sensor 88 to be in a non-corresponding relation NCR to the intended/desired direction of travel DOT1 directed by the steering instructions 82. Once the non-corresponding relation NCR occurs, the next step is for the operating program 92 to determine if the non-corresponding relation NCR between the directional position 120a indicated by the directional sensor 88 and the intended/desired direction of travel DOT1 of the steering instructions 72 is beyond an acceptable parameter 122 or not. If the non-corresponding relation NCR is beyond the acceptable parameter 122, the final step is for the operating program 92 to operate one or more notification devices 90 to activate a directional indicator signal 124 that notifies the control system 64 of the malfunctioning condition 22 so it may take appropriate action 126 with regard to the malfunctioning condition 22. Depending on the circumstances, one likely appropriate action 126 is to stop the autonomous vehicle 14. Typically, the control system 64 will contact a person responsible for the monitoring the operation of the autonomous vehicle 14 and inform the person of the shut-down status so he or she can send someone out to inspect the malfunctioning condition 22 and, if possible, fix the problem.

FIG. 16 describes a method 12 similar to that of FIG. 15 except that the initial step comprises moving an autonomous vehicle 14 and a towed vehicle 16 along a path 18 in an area 20 in an intended/desired direction of travel DOT1, with a towing mechanism 24 interconnecting the autonomous vehicle 14 and the towed vehicle 16, the autonomous vehicle 14 having a control system 64 and a vehicle steering system 58 controlling at least one steerable wheel 70 and a guidance system having one or more data gathering devices 78 connected to a guidance computer 82 (as set forth above), and the area 20 having a plurality of path markers 54 that define at least one guidance row 104 in the intended/desired direction of travel DOT1. The autonomous vehicle 14 moves along the path 18 pursuant to steering instructions 72 form the control system 64. The next step is operating one or more directional sensors 88 to determine a directional position 120a for the one or more steerable wheels 70, a directional position 120b for the towing mechanism 24 and/or a directional position 120c for the towed vehicle 16. The next step is comparing at least one of the directional positions 120 to the intended/desired direction of travel DOT1 to determine if the directional position 120 indicated by the directional sensor 88 is in corresponding relation CR to the intended/desired direction of travel DOT1 directed by the steering instructions 82. The next step is continuing to move the autonomous vehicle 14 and towed vehicle 16 along the path 18 by operating the guidance system 80, transmitting steering instructions 72 to the steerable wheels 70 and verifying proper positioning of the autonomous vehicle 14 with the directional sensors 88. The next step is incurring a malfunctioning condition 22 that causes an unintended/undesired direction of travel DOT2 for the autonomous vehicle 14 and the directional position 120 to be in a non-corresponding relation NCR to the intended/desired direction of travel DOT1. Once the non-corresponding relation NCR occurs, the next step is for the operating program 92 to determine if the non-corresponding relation NCR between the directional position 120 indicated by the directional sensor 88 and the intended/desired direction of travel DOT1 of the steering instructions 72 is beyond an acceptable parameter 122 or not. If the non-corresponding relation NCR is beyond the acceptable parameter 122, the final step is for the operating program 92 to operate one or more notification devices 90 to activate a directional indicator signal 124 that notifies the control system 64 of the malfunctioning condition 22 so it may take appropriate action 126 with regard to the malfunctioning condition 22. One likely appropriate action 126 is to stop the autonomous vehicle 14 and contact a person who is responsible for monitoring the operation of the autonomous vehicle 14 and to inform the person of the shut-down status so he or she can send someone out to inspect the malfunctioning condition 22 and, if possible, fix the problem.

As set forth above, although the description and figures set forth herein generally describe and show particular materials, shapes and configurations for the various components of the towed vehicle improper operation detection system 10 and method 12 of the present invention and examples of various autonomous vehicles 14, towed vehicles 16 and towing mechanisms 14 with which the new system 10 and method 12 may be utilized, persons who are skilled in the relevant arts will readily appreciate that the present invention is not so limited. For instance, although the autonomous vehicle 14 shown in FIGS. 1, 3 and 5-6 is a tractor, persons who are skilled in the art will readily appreciate that autonomous vehicle 14 can be any type of configuration of motor vehicle, including cars, trucks, mechanical harvesters, ATVs, RVs and the like that can move on a surface 40 which is defined by the path 18 in which the autonomous vehicle 14 moves in an intended/desired direction of travel DOT1 through area 20. In addition to different types of autonomous vehicles 14 and towed vehicles 16, the new system 10 and method 12 can be utilized with autonomous vehicles 14 that are used, primarily or even exclusively, to move along a path 16 having a surface 40 defining a freeway, highway, road, street, driveway, track or the like, whether the surface 40 of the path 16 is paved, dirt, concrete, steel or comprising other materials or combinations thereof. The guidance row 104 can be defined by any type of plants 28, plant support structures 48 and/or upwardly extending members 52. As such, persons who are skilled in the art will readily appreciate that the new system 10 and method 12 of the present invention can be utilized with any type of autonomous vehicle 14 and any type of towed vehicle 16 that can move on or along any type of path 18, no matter the shape, type and configuration of autonomous vehicle 14, towed vehicle 16 and/or area 20.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A vehicle navigation system for navigating through an area along a path on a surface in an intended/desired direction of travel, said system comprising:

an autonomous vehicle having a vehicle steering system operatively connected to a steerable wheel, said vehicle steering system configured to transmit steering instructions to said steerable wheel to control directional movement of said autonomous vehicle;

a plurality path markers that are disposed in or above the surface of the area, said plurality of path markers defining a guidance row, each of said path markers having a body extending upwardly above the surface;

a control system associated with said autonomous vehicle, said control system configured to transmit steering instructions to said vehicle steering system to control said steerable wheel of said autonomous vehicle, and to direct said autonomous vehicle on the surface along the path;

a guidance system associated with said autonomous vehicle to determine positioning information that locates said path markers of said guidance row and to calculate a vehicle position of said autonomous vehicle relative to said guidance row and a path position in spaced apart relation to said guidance row that is utilized to identify where said autonomous vehicle should be located to be on the path, said guidance system comprising a data gathering device carried by said autonomous vehicle and a guidance computer connected to or integral with said control system, said data gathering device configured to engage at least one of said path markers in said guidance row; and a guidance program associated with said guidance computer and electronically connected to each of said control system and said data gathering device, said guidance program configured to calculate said positioning information and said path position and to utilize each of said positioning information and said path position to calculate said steering instructions necessary to guide said autonomous vehicle along said path and transmit said steering instructions to said control system.

2. The system of claim 1, wherein said path markers comprise at least one of a trunk of a plant, a post of a plant support structure and an upwardly extending member.

3. The system of claim 1, wherein said path position is calculated based on at least one of a spacing distance between said vehicle position and said guidance row and said row spacing between adjacent guidance rows.

4. The system of claim 1, wherein said data gathering device is one of a LIDAR system, a radar system and a camera.

5. The system of claim 1 further comprising a marker segment defined by or located on said body of each of said path markers, said data gathering device configured to engage said marker segment of at least one of said path markers in said guidance row.

6. The system of claim 5, wherein said marker segment has a first end and a second end in spaced apart relation to said first end, one of said first end of said marker segment being in corresponding relation to a lower end of said body of said path markers and said second end of said marker segment being in corresponding relation to an upper end of said body of said path markers.

7. The system of claim 5, wherein said marker segment has a first end and a second end in spaced apart relation to said first end, said first end of said marker segment being in corresponding relation to a lower end of said body of said path markers and said second end of said marker segment being in corresponding relation to an upper end of said body of said path markers.

8. The system of claim 5, wherein said marker segment has a first end and a second end in spaced apart relation to said first end, one of said first end of said marker segment being in spaced apart relation to a lower end path markers and said second end of said marker segment being in spaced apart relation to an upper end of said path markers.

9. The system of claim 5, wherein said marker segment has a first end and a second end in spaced apart relation to said first end, said first end of said marker segment being in spaced apart relation to a lower end of said body of said path markers and said second end of said marker segment being in spaced apart relation to an upper end of said body of said path markers.

10. The system of claim 5, wherein at least one of said marker segments comprises a marking device on one of said path markers.

11. The system of claim 1 further comprising a directional sensor associated with said steerable wheel of said autonomous vehicle and an operating program electronically connected to said control system, said directional sensor structured and arranged to determine a directional position of said steerable wheel, said operating program configured to compare said directional position of said steerable wheel to said steering instructions to determine whether said steering instructions and said directional position of said steerable wheel are in one of a corresponding relation indicating a normal operating condition and a non-corresponding relation indicating a malfunctioning condition.

12. The system of claim 11, wherein said operating program electronically interconnects said directional sensor to a notification device, said notification device configured to notify said control system of at least one of said normal operating condition and said malfunctioning condition.

13. The system of claim 12, wherein said malfunctioning condition is only indicated if said non-corresponding relation exceeds an acceptable parameter relative to said normal operating condition.

14. A vehicle navigation system for navigating through an area along a path on a surface in an intended/desired direction of travel, said system comprising:

an autonomous vehicle having a vehicle steering system operatively connected to a steerable wheel, said vehicle steering system configured to transmit steering instructions to said steerable wheel to control directional movement of said autonomous vehicle;

a plurality path markers that are disposed in or above the surface of the area, said plurality of path markers defining a guidance row, each of said path markers having a body extending upwardly above the surface;

a marker segment defined by or located on said body of each of said path markers;

a control system associated with said autonomous vehicle, said control system configured to transmit steering instructions to said vehicle steering system to control said steerable wheel of said autonomous vehicle, and to direct said autonomous vehicle on the surface along the path;

a directional sensor associated with said autonomous vehicle, said directional sensor structured and arranged to engage said steerable wheel so as to determine a directional position of said steerable wheel;

a guidance system associated with said autonomous vehicle to determine positioning information that locates said path markers of said guidance row and to calculate a vehicle position of said autonomous vehicle relative to said guidance row and a path position in spaced apart relation to said guidance row that is utilized to identify where said autonomous vehicle should be located to be on the path, said guidance system comprising a data gathering device carried by said autonomous vehicle and a guidance computer connected to or integral with said control system, said data gathering device configured to engage said marker segment on at least one of said path markers in said guidance row;

a guidance program associated with said guidance computer and electronically connected to each of said control system and said data gathering device, said guidance program configured to calculate said positioning information and said path position and to utilize each of said positioning information and said path position to calculate said steering instructions necessary to guide said autonomous vehicle along the path and transmit said steering instructions to said control system; and an operating program electronically connected to said control system, said operating program configured to compare said directional position of said steerable wheel to said steering instructions to determine whether said steering instructions and said directional position of said steerable wheel are in one of a corresponding relation indicating a normal operating condition and a non-corresponding relation indicating a malfunctioning condition.

15. The system of claim 14, wherein said path markers comprise at least one of a trunk of a plant, a post of a plant support structure and an upwardly extending member.

16. The system of claim 14, wherein said data gathering device is one of a LIDAR system, a radar system and a camera.

17. The system of claim 14, wherein said marker segment has a first end and a second end in spaced apart relation to said first end, at least one of said first end of said marker segment being in corresponding relation to a lower end of said body of said path markers and said second end of said marker segment being in corresponding relation to an upper end of said body of said path markers.

18. The system of claim 14, wherein at least one of said marker segments comprises a marking device on one of said path markers.

19. The system of claim 14, wherein said marker segment has a first end and a second end in spaced apart relation to said first end, at least one of said first end of said marker segment being in spaced apart relation to a lower end path markers and said second end of said marker segment being in spaced apart relation to an upper end of said path markers.

20. The system of claim 19, wherein said operating program electronically interconnects said directional sensor to a notification device, said notification device configured to notify said control system of at least one of said normal operating condition and said malfunctioning condition.

21. A method of autonomously navigating through an area along a path on a surface in an intended/desired direction of travel, said method comprising the steps of:
a) providing an autonomous vehicle having a vehicle steering system operatively controlling at least one steerable wheel, a guidance system having one or more data gathering devices connected to a guidance computer and a plurality of path markers in the area that define at least one guidance row along which said autonomous vehicle will move when moving on the path, said guidance row having a first end and a second end;
b) positioning said autonomous vehicle at or near said first end of said guidance row to allow said autonomous vehicle to move in the intended/desired direction of travel toward said second end of said guidance row;
c) operating said autonomous vehicle to move said autonomous vehicle toward said second end of said guidance row;
d) operating said data gathering devices to operatively engage one or more of said plurality of path markers in at least one guidance row;
e) operating a guidance program with said guidance computer, wherein said operating system comprises: determining positioning information that locates said path markers of said guidance row, calculating a vehicle position for said autonomous vehicle relative to said guidance row, and calculating a path position in spaced apart relation to said guidance row that is utilized to identify where said autonomous vehicle should be located to be on the path;
f) comparing said vehicle position of said autonomous vehicle to said path position to determine steering instructions needed to keep or place said vehicle position of said autonomous vehicle at least substantially in alignment with the intended/desired direction of travel so as to position said autonomous vehicle on the path;
g) transmitting said steering instructions to said vehicle steering system by said control system so as to place said at least one steerable wheel in position to move said autonomous vehicle along the path in the intended/desired direction of travel; and
h) moving said autonomous vehicle along the path toward said second end of said guidance row in the intended/desired direction of travel pursuant to said steering instructions.

22. The method of claim 21 further comprising step: (i) while moving said autonomous vehicle on the path, operating a directional sensor to determine a directional position for said at least one steerable wheel and then comparing said directional position to the intended/desired direction of travel to determine if said directional position is in one of a corresponding relation to the intended/desired direction of travel of said steering instructions and a non-corresponding relation to the intended direction of travel.

23. The method of claim 22 further comprising the step: (j) operating a notification device to activate a directional indicator signal notifying said control system of a malfunctioning condition if said directional position is in said non-corresponding relation and said non-corresponding relation exceeds an acceptable parameter relative to a normal operating condition to allow said control system to take an appropriate action with regard to said malfunctioning condition.

24. The method of claim 21, wherein said path markers comprise at least one of a trunk of a plant, a post of a plant support structure and an upwardly extending member.

25. The method of claim 21, wherein said data gathering device is one of a LIDAR system, a radar system and a camera.

26. The method of claim 21 further comprising a marker segment defined by or located on said body of each of said path markers, said data gathering device configured to engage said marker segment of at least one of said path markers in said guidance row.

27. The method of claim 26, wherein said marker segment has a first end and a second end in spaced apart relation to said first end, at least one of said first end of said marker segment being in corresponding relation to a lower end of said body of said path markers and said second end of said marker segment being in corresponding relation to an upper end of said body of said path markers.

28. The method of claim 26, wherein at least one of said marker segments comprises a marking device on one of said path markers.

29. The method of claim 26, wherein said marker segment has a first end and a second end in spaced apart relation to said first end, at least one of said first end of said marker segment being in spaced apart relation to a lower end path markers and said second end of said marker segment being in spaced apart relation to an upper end of said path markers.

* * * * *